(12) United States Patent
Montag et al.

(10) Patent No.: US 11,748,083 B2
(45) Date of Patent: Sep. 5, 2023

(54) SYSTEMS, METHODS AND DEVICES FOR DEVICE FINGERPRINTING AND AUTOMATIC DEPLOYMENT OF SOFTWARE IN A COMPUTING NETWORK USING A PEER-TO-PEER APPROACH

(71) Applicant: Sentinel Labs Israel Ltd., Tel Aviv (IL)

(72) Inventors: Nir Montag, Tel Aviv (IL); Ido Kotler, Tel Aviv (IL); Matan Mates, Tel Aviv (IL); Mike Vincent Petronaci, Wellesley, MA (US); Gustavo Ringel, Tel Aviv (IL); Caleb Joshua Fenton, Union City, CA (US)

(73) Assignee: Sentinel Labs Israel Ltd., Tel Aviv (IL)

( * ) Notice: Subject to any disclaimer, the term of this patent is extended or adjusted under 35 U.S.C. 154(b) by 0 days.

(21) Appl. No.: 18/093,737

(22) Filed: Jan. 5, 2023

(65) Prior Publication Data
US 2023/0153090 A1    May 18, 2023

Related U.S. Application Data

(63) Continuation of application No. 17/471,822, filed on Sep. 10, 2021, now Pat. No. 11,579,857.
(Continued)

(51) Int. Cl.
*G06F 9/44* (2018.01)
*G06F 8/60* (2018.01)
(Continued)

(52) U.S. Cl.
CPC ............ *G06F 8/60* (2013.01); *H04L 63/0876* (2013.01); *H04L 63/168* (2013.01); *H04L 67/34* (2013.01)

(58) Field of Classification Search
None
See application file for complete search history.

(56) References Cited

U.S. PATENT DOCUMENTS

| | | |
|---|---|---|
| 4,979,118 A | 12/1990 | Kheradpir |
| 5,311,593 A | 5/1994 | Carmi |

(Continued)

FOREIGN PATENT DOCUMENTS

| | | |
|---|---|---|
| CN | 103607399 A | 2/2014 |
| EP | 3 171 568 | 5/2017 |
| JP | 2016-512631 | 4/2016 |

(Continued)

OTHER PUBLICATIONS

Barbhuiya et al., "Detection of neighbor solicitation and advertisement spoofing in IPv6 neighbor discovery protocol." Proceedings of the 4th international conference on Security of information and networks. (2011).

(Continued)

*Primary Examiner* — Anna C Deng
(74) *Attorney, Agent, or Firm* — PERKINS COIE LLP

(57) ABSTRACT

Disclosed herein are embodiments of methods, devices and systems for device fingerprinting and automatic and dynamic software deployment to one or more endpoints on a computer network. The device fingerprinting systems and devices herein are configured to operate with limited data without sitting between network devices and the internet, without monitoring all network traffic, and without limited or no active scanning. The embodiments herein may passively collect information as distributed peers and may perform very limited active scans. In some embodiments, the information is used as an input to a custom hierarchical learning model to fingerprint devices on a network by identifying attributes of the devices such as the operating system family, operating system version, and device role. In some embodiments, a dynamic deployer selection process (Continued)

may be utilized to simply and efficiently deploy software. Some embodiments herein involve end-to-end encryption of credentials in a deployment process.

22 Claims, 16 Drawing Sheets

Related U.S. Application Data

(60) Provisional application No. 63/173,191, filed on Apr. 9, 2021, provisional application No. 63/126,162, filed on Dec. 16, 2020.

(51) Int. Cl.
*H04L 9/40* (2022.01)
*H04L 67/00* (2022.01)

(56) References Cited

U.S. PATENT DOCUMENTS

| | | | |
|---|---|---|---|
| 6,154,844 A | 11/2000 | Touboul et al. | |
| 6,157,953 A | 12/2000 | Chang et al. | |
| 6,728,716 B1 | 4/2004 | Bhattacharya et al. | |
| 6,804,780 B1 | 10/2004 | Touboul | |
| 6,836,888 B1 | 12/2004 | Basu et al. | |
| 7,076,696 B1 | 7/2006 | Stringer | |
| 7,093,239 B1 | 8/2006 | Van der Made | |
| 7,181,769 B1 | 2/2007 | Keanini et al. | |
| 7,225,468 B2 | 5/2007 | Waisman et al. | |
| 7,299,294 B1 | 11/2007 | Bruck et al. | |
| 7,305,546 B1 | 12/2007 | Miller | |
| 7,322,044 B2 | 1/2008 | Hrastar | |
| 7,464,407 B2 | 12/2008 | Nakae et al. | |
| 7,530,106 B1 | 5/2009 | Zaitsev et al. | |
| 7,543,269 B2 | 6/2009 | Krueger | |
| 7,546,587 B2 | 6/2009 | Marr et al. | |
| 7,574,740 B1 | 8/2009 | Kennis | |
| 7,596,807 B2 | 9/2009 | Ptacek et al. | |
| 7,596,808 B1 | 9/2009 | Wilkinson et al. | |
| 7,710,933 B1 | 5/2010 | Sundaralingam et al. | |
| 7,739,516 B2 | 6/2010 | Bender et al. | |
| 7,832,012 B2 | 11/2010 | Huddleston | |
| 7,882,538 B1 | 2/2011 | Palmer | |
| 7,890,612 B2 | 2/2011 | Todd et al. | |
| 7,937,755 B1 | 5/2011 | Guruswamy | |
| 7,984,129 B2 | 7/2011 | Vaught | |
| 8,015,605 B2 | 9/2011 | Yegneswaran | |
| 8,024,795 B2 | 9/2011 | Newton | |
| 8,042,186 B1 | 10/2011 | Polyakov et al. | |
| 8,065,722 B2 | 11/2011 | Barford et al. | |
| 8,078,556 B2 | 12/2011 | Adi et al. | |
| 8,082,471 B2 | 12/2011 | Khan | |
| 8,131,281 B1 | 3/2012 | Hildner et al. | |
| 8,141,154 B2 | 3/2012 | Gruzman et al. | |
| 8,156,556 B2 | 4/2012 | Krishnamurthy | |
| 8,171,545 B1 | 5/2012 | Cooley et al. | |
| 8,181,033 B1 | 5/2012 | Paul et al. | |
| 8,181,250 B2 | 5/2012 | Rafalovich et al. | |
| 8,204,984 B1 | 6/2012 | Aziz | |
| 8,205,035 B2 | 6/2012 | Reddy et al. | |
| 8,230,505 B1 | 7/2012 | Ahrens et al. | |
| 8,296,842 B2 | 10/2012 | Singh et al. | |
| 8,327,442 B2 | 12/2012 | Herz et al. | |
| 8,353,033 B1 | 1/2013 | Chen et al. | |
| 8,370,931 B1 | 2/2013 | Chien et al. | |
| 8,375,444 B2 | 2/2013 | Aziz et al. | |
| 8,375,447 B2 | 2/2013 | Amoroso et al. | |
| 8,413,238 B1 | 4/2013 | Sutton | |
| 8,413,241 B2 | 4/2013 | Weeks et al. | |
| 8,418,250 B2 | 4/2013 | Morris et al. | |
| 8,438,386 B2 | 5/2013 | Hegli et al. | |
| 8,438,626 B2 | 5/2013 | Anderson et al. | |
| 8,443,442 B2 | 5/2013 | Wang et al. | |
| 8,474,044 B2 | 6/2013 | Zawadowskiy et al. | |
| 8,488,466 B2 | 7/2013 | Breslin et al. | |
| 8,528,057 B1 | 9/2013 | Garrett | |
| 8,528,087 B2 | 9/2013 | Hsu et al. | |
| 8,538,578 B2 | 9/2013 | Battles et al. | |
| 8,539,582 B1 | 9/2013 | Aziz et al. | |
| 8,549,643 B1 | 10/2013 | Shou | |
| 8,555,385 B1 | 10/2013 | Bhatkar et al. | |
| 8,561,177 B1 | 10/2013 | Aziz et al. | |
| 8,566,946 B1 | 10/2013 | Aziz et al. | |
| 8,607,054 B2 | 12/2013 | Ramarathinam et al. | |
| 8,607,340 B2 | 12/2013 | Wright | |
| 8,627,475 B2 | 1/2014 | Loveland et al. | |
| 8,677,494 B2 | 3/2014 | Edery et al. | |
| 8,713,306 B1 | 4/2014 | Bennett | |
| 8,719,937 B2 | 5/2014 | Sundaram et al. | |
| 8,725,898 B1 | 5/2014 | Vincent | |
| 8,726,389 B2 | 5/2014 | Morris et al. | |
| 8,732,296 B1 | 5/2014 | Thomas et al. | |
| 8,752,173 B2 | 6/2014 | Yadav | |
| 8,789,135 B1 | 7/2014 | Pani | |
| 8,793,151 B2 | 7/2014 | Delzoppo et al. | |
| 8,821,242 B2 | 9/2014 | Hinman et al. | |
| 8,839,369 B1 | 9/2014 | Dai et al. | |
| 8,849,880 B2 | 9/2014 | Thelen | |
| 8,850,582 B2 | 9/2014 | Endoh et al. | |
| 8,880,435 B1 | 11/2014 | Catlett et al. | |
| 8,881,282 B1 | 11/2014 | Aziz et al. | |
| 8,893,278 B1 | 11/2014 | Chechik | |
| 8,898,788 B1 | 11/2014 | Aziz et al. | |
| 8,904,527 B2 | 12/2014 | Dawson et al. | |
| 8,943,594 B1 | 1/2015 | Arrowood | |
| 8,949,986 B2 | 2/2015 | Ben-Shalom | |
| 8,959,338 B2 | 2/2015 | Snow et al. | |
| 8,973,142 B2 | 3/2015 | Shulman et al. | |
| 8,984,637 B2 | 3/2015 | Karecha et al. | |
| 9,009,829 B2 | 4/2015 | Stolfo et al. | |
| 9,027,135 B1 | 5/2015 | Aziz | |
| 9,043,920 B2 | 5/2015 | Gula et al. | |
| 9,081,747 B1 * | 7/2015 | Tabieros | G06F 9/4411 |
| 9,117,078 B1 | 8/2015 | Chien et al. | |
| 9,141,792 B2 | 9/2015 | Baluda et al. | |
| 9,166,993 B1 | 10/2015 | Liu | |
| 9,185,136 B2 | 11/2015 | Dulkin et al. | |
| 9,195,480 B2 * | 11/2015 | Wang | G06F 9/44526 |
| 9,197,601 B2 | 11/2015 | Pasdar | |
| 9,213,838 B2 | 12/2015 | Lu | |
| 9,225,734 B1 | 12/2015 | Hastings | |
| 9,240,976 B1 | 1/2016 | Murchison | |
| 9,246,774 B2 | 1/2016 | Mataitis et al. | |
| 9,270,690 B2 | 2/2016 | Kraitsman et al. | |
| 9,305,165 B2 | 4/2016 | Snow et al. | |
| 9,329,973 B2 | 5/2016 | Bhuyan | |
| 9,330,259 B2 | 5/2016 | Klein et al. | |
| 9,356,942 B1 | 5/2016 | Joffe | |
| 9,356,950 B2 | 5/2016 | Vissamsetty et al. | |
| 9,369,476 B2 | 6/2016 | Chekina et al. | |
| 9,386,034 B2 | 7/2016 | Cochenour | |
| 9,398,001 B1 | 7/2016 | Tidd | |
| 9,407,602 B2 | 7/2016 | Feghali et al. | |
| 9,413,721 B2 | 8/2016 | Morris et al. | |
| 9,430,646 B1 | 8/2016 | Mushtaq et al. | |
| 9,432,360 B1 | 8/2016 | Triandopoulos et al. | |
| 9,438,614 B2 | 9/2016 | Herz | |
| 9,495,188 B1 | 11/2016 | Ettema et al. | |
| 9,503,470 B2 | 11/2016 | Gertner et al. | |
| 9,547,516 B2 | 1/2017 | Thakkar et al. | |
| 9,578,045 B2 | 2/2017 | Jaroch et al. | |
| 9,591,006 B2 | 3/2017 | Siva et al. | |
| 9,601,000 B1 | 3/2017 | Gruss et al. | |
| 9,602,531 B1 | 3/2017 | Wallace et al. | |
| 9,606,893 B2 | 3/2017 | Gupta et al. | |
| 9,607,146 B2 | 3/2017 | Sridhara et al. | |
| 9,609,019 B2 | 3/2017 | Vissamsetty et al. | |
| 9,628,498 B1 | 4/2017 | Aziz et al. | |
| 9,641,544 B1 | 5/2017 | Treat et al. | |
| 9,641,550 B2 | 5/2017 | Kraitsman et al. | |
| 9,705,904 B1 | 7/2017 | Davis et al. | |
| 9,710,648 B2 | 7/2017 | Weingarten | |
| 9,712,547 B2 | 7/2017 | Touboul et al. | |

(56) References Cited

U.S. PATENT DOCUMENTS

| | | |
|---|---|---|
| 9,769,204 B2 | 8/2017 | Vissamsetty et al. |
| 9,772,832 B2 * | 9/2017 | Rubio .................. G06F 8/61 |
| 9,781,148 B2 | 10/2017 | Mahaffey et al. |
| 9,807,092 B1 | 10/2017 | Gutzmann |
| 9,807,115 B2 | 10/2017 | Kolton et al. |
| 9,813,451 B2 | 11/2017 | Honda et al. |
| 9,871,766 B2 | 1/2018 | Syed et al. |
| 9,877,210 B1 | 1/2018 | Hildner et al. |
| 9,888,032 B2 | 2/2018 | Dekel et al. |
| 9,898,763 B1 | 2/2018 | Vaynblat et al. |
| 9,942,270 B2 | 3/2018 | Vissamsetty et al. |
| 10,025,928 B2 | 7/2018 | Jaroch et al. |
| 10,044,675 B1 | 8/2018 | Ettema et al. |
| 10,102,374 B1 | 10/2018 | Cohen et al. |
| 10,169,586 B2 | 1/2019 | Maciejak et al. |
| 10,237,282 B2 | 3/2019 | Nelson et al. |
| 10,250,636 B2 | 4/2019 | Vissamsetty et al. |
| 10,257,224 B2 | 4/2019 | Jaroch et al. |
| 10,284,591 B2 | 5/2019 | Giuliani et al. |
| 10,375,110 B2 | 7/2019 | Vissamsetty et al. |
| 10,382,484 B2 | 8/2019 | Shayevitz et al. |
| 10,476,891 B2 | 11/2019 | Vissamsetty et al. |
| 10,509,905 B2 | 12/2019 | Vissamsetty et al. |
| 10,542,044 B2 | 1/2020 | Vissamsetty et al. |
| 10,567,431 B2 | 1/2020 | Vissamsetty et al. |
| 10,574,698 B1 * | 2/2020 | Sharifi Mehr ...... H04L 63/1491 |
| 10,599,842 B2 | 3/2020 | Vissamsetty et al. |
| 10,599,844 B2 | 3/2020 | Schmidtler et al. |
| 10,609,074 B2 | 3/2020 | Vissamsetty et al. |
| 10,757,090 B2 | 8/2020 | Kahol et al. |
| 10,826,941 B2 | 11/2020 | Jain et al. |
| 10,855,671 B2 | 12/2020 | Kahol et al. |
| 10,938,854 B2 | 3/2021 | Strogov et al. |
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,470,115 B2 | 10/2022 | Vissamsetty et al. |
| 11,507,663 B2 | 11/2022 | Cohen et al. |
| 11,522,894 B2 | 12/2022 | Weingarten et al. |
| 11,579,857 B2 | 2/2023 | Montag et al. |
| 11,580,218 B2 | 2/2023 | Enfinger |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0145225 A1 | 7/2003 | Bruton, III et al. |
| 2003/0145226 A1 | 7/2003 | Bruton, III et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 | 5/2005 | Khazan et al. |
| 2005/0138402 A1 | 6/2005 | Yoon et al. |
| 2005/0204157 A1 | 9/2005 | Johnson |
| 2005/0223239 A1 | 10/2005 | Dotan |
| 2005/0240989 A1 | 10/2005 | Kim et al. |
| 2006/0053490 A1 | 3/2006 | Herz et al. |
| 2006/0085543 A1 | 4/2006 | Hrastar |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0208822 A1 | 9/2007 | Wang et al. |
| 2007/0208936 A1 | 9/2007 | Ramos |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2011/0023118 A1 | 1/2011 | Wright et al. |
| 2011/0067107 A1 | 3/2011 | Weeks et al. |
| 2011/0078309 A1 | 3/2011 | Bloch |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen |
| 2011/0178930 A1 | 7/2011 | Scheldt et al. |
| 2011/0185430 A1 | 7/2011 | Sallam |
| 2011/0214176 A1 | 9/2011 | Burch et al. |
| 2011/0214182 A1 | 9/2011 | Adams et al. |
| 2011/0219443 A1 | 9/2011 | Hampel |
| 2011/0219449 A1 | 9/2011 | St. Neitzel |
| 2011/0247071 A1 | 10/2011 | Hooks et al. |
| 2011/0271341 A1 | 11/2011 | Satish et al. |
| 2011/0288940 A1 | 11/2011 | Hordan et al. |
| 2012/0023572 A1 | 1/2012 | William, Jr. et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |

(56) References Cited

U.S. PATENT DOCUMENTS

| | | |
|---|---|---|
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Marayanaswamy et al. |
| 2012/0255003 A1 | 10/2012 | Sallam |
| 2012/0255004 A1 | 10/2012 | Sallam |
| 2012/0291090 A1 | 11/2012 | Srinivasan et al. |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1* | 2/2013 | Malik ............... H04L 45/563 709/203 |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1* | 10/2013 | Zhou ............... G06F 21/566 726/23 |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0046645 A1 | 2/2014 | White et al. |
| 2014/0053267 A1 | 2/2014 | Klein et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0123280 A1 | 5/2014 | Kedma |
| 2014/0137246 A1 | 5/2014 | Baluda |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0282816 A1 | 9/2014 | Xie et al. |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Haim et al. |
| 2015/0143496 A1 | 5/2015 | Thomas et al. |
| 2015/0150125 A1 | 5/2015 | Dulkin et al. |
| 2015/0150130 A1 | 5/2015 | Fiala |
| 2015/0156214 A1 | 6/2015 | Kaminsky |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0350236 A1 | 12/2015 | Klinghofer et al. |
| 2015/0358345 A1 | 12/2015 | Clark et al. |
| 2015/0373039 A1 | 12/2015 | Wang |
| 2015/0381376 A1 | 12/2015 | Wardman et al. |
| 2016/0028750 A1 | 1/2016 | Di Pietro et al. |
| 2016/0042179 A1 | 2/2016 | Weingarten |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von Gravrock et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0019425 A1* | 1/2017 | Ettema ............... G06F 9/4401 |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0206142 A1* | 7/2017 | Pawar ............... G06F 11/1458 |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahmy et al. |
| 2017/0244749 A1 | 8/2017 | Shulman et al. |
| 2017/0244755 A1 | 8/2017 | Tsao |

(56) References Cited

U.S. PATENT DOCUMENTS

| | | |
|---|---|---|
| 2017/0264639 A1 | 9/2017 | Sama et al. |
| 2017/0279839 A1* | 9/2017 | Vasseur ............... H04L 63/1425 |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0248896 A1 | 8/2018 | Challita et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Vissamsetty et al. |
| 2019/0114426 A1 | 4/2019 | Cohen et al. |
| 2019/0199736 A1 | 6/2019 | Howard et al. |
| 2019/0354355 A1 | 11/2019 | Jacobson et al. |
| 2019/0379697 A1 | 12/2019 | Vissamsetty et al. |
| 2020/0143054 A1 | 5/2020 | Cohen et al. |
| 2020/0218806 A1 | 7/2020 | Cho |
| 2020/0252429 A1 | 8/2020 | Vissamsetty et al. |
| 2020/0374087 A1 | 11/2020 | Vissamsetty et al. |
| 2021/0397710 A1 | 12/2021 | Cohen et al. |
| 2022/0070256 A1* | 3/2022 | Singh ................. H04L 67/1095 |
| 2022/0391496 A9 | 12/2022 | Cho |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |

FOREIGN PATENT DOCUMENTS

| | | |
|---|---|---|
| JP | 2017-504102 | 2/2017 |
| KR | 10-2015-0101811 | 9/2015 |
| KR | 10-1969572 | 4/2019 |
| WO | WO 02/27440 A2 | 4/2002 |
| WO | WO 2010/030169 A2 | 3/2010 |
| WO | WO 2012/027669 | 3/2012 |
| WO | WO 2013/014672 | 1/2013 |
| WO | WO 2015/171780 A1 | 11/2015 |
| WO | WO 2015/171789 A1 | 11/2015 |
| WO | WO 2016/024268 | 2/2016 |
| WO | WO 2016/081561 A1 | 5/2016 |
| WO | WO 2017/064710 | 4/2017 |
| WO | WO 2019/092530 | 5/2019 |
| WO | WO 2019/032728 | 3/2020 |

OTHER PUBLICATIONS

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

Installing a Tanium Client—distributed also using user/password (not encrypted) from a hosted Module server, downloaded from https://docs.tanium.eom/client/client/deployment.html#client_ management on Apr. 1, 2021.

IBM Software, "Stepping up the battle against advanced threats", IBM Trusteer Apex Thought Leadership White Paper, Dec. 2013, WGW03043-USEN-00.

"IBM Security Qradar SIEM Installation Guide" downloaded from http://www.siem.su/docs/ibm/Installation_and_updating/IBM_ Security_QRadar_installation_Guide.pdf, printed 2013, vol. 7.2 in 54 pages.

IBM Security Guardium Insights for IBM Cloud Park for Security, printed from https://www.ibm.com/downloads/cas/QY1RYRLP, printed May 26, 2021 in 12 pages.

IBM Security Qradar Solutuion Brief "Visibility, detection, investigation and response" printed from https://www.ibm.com/downloads/ cas/OP62GKAR, printed on May 26, 2021 in 11 pgs.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ ENUSZP14-0390/ENUSZP14-0390.PDF, printed Aug. 5, 2014, in 9 pgs.

IBM Guardium Documentation "Components and Topology", downloaded from https://www.ibm.com/docs/en/qsip/7.4?topic=deployment-qradar-architecture-overview, printed on Jun. 8, 2021 in 3 pages.

IBM Software "Stepping up the battle against advanced threats", downloaded from https://citrixready.citrix.com/content/dam/ready/ partners/ib/ibm-global-services/ibm-security-trusteer-apex-advanced-malware-protection/wgw03043usen.pdf, Printed Dec. 2013 in 12 pages.

Laureano et al., M., "Intrusion detection in virtual machine environments. In Euromicro Conference, 2004. Proceedings." 30th (pp. 520-525). IEEE Sep. 30, 2004.

Liu, Yu-Feng; Zhang Li-Wei; Liang, Juan; Qu, Sheng; Ni, Zhi-Qiang;, "Detecting Trojan Horses Based on System Behavior Using Machine Learning Method", International Conference on Machine Learning and Cybernetics (ICMLC), IEEE, Jul. 11-14, 2010, pp. 855-860.

IBM, "Qradar Architecture overview", downloaded from https:// www.ibm.com/docs/en/qsip/7.4?topic=deployment-qradar-architecture-overview printed May 28, 2021 in 6 pgs.

Moussaileb et al., "Ransomware's Early Mitigation Mechanisms," Proceedings ARES 2018 Proceedings of the 13th International Conference on Availability, Reliability and Security Article No. 2, pp. 1-10 (2018).

Ornaghi et al., "Man in the middle attacks." Blackhat Conference Europe (2003).

Ramachandran et al., "Detecting ARP spoofing: An active technique." International Conference on Information Systems Security, Springer, Berlin, Heidelberg (2005).

Rudiger Schollmeier, A Definition of Peer-to-Peer Networking for the Classification of Peer-to-Peer Architectures and Applications, Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.

Tanium™ Client Management 1.6 User Guide, downloaded from https://docs.tanium.com/client_management/client_management/ index.html on Apr. 1, 2021.

Ullrich et al., "IPv6 Security: Attacks and Countermeasures in a Nutshell." 8th USENIX Workshop on Offensive Technologies (2015).

Xu, J-Y; Sung, A.H.; Chavez, P.; Mukkamala, S.; "Polymorphic Malicious Executable Scanner by API Sequence Analysis", Fourth

(56) References Cited

OTHER PUBLICATIONS

International Conference on Hybrid Intelligent Systems, IEEE Dec. 5-8, 2004, pp. 378-383.
Communication Pursuant to Article 94(3) EPC dated Dec. 11, 2018 for European Application 15 760 520.5, in 7 pages.
Extended European Search Report dated May 9, 2019 for Application No. 16855062.2, in 7 pages.
European Search Report dated Apr. 29, 2021 in European Patent Application No. 18844671 in 38 pages.
Extended European Search Report dated Jan. 25, 2021 for European Patent Application No. 20181537.0, in 10 pages.
Reaqta Hive, A.I. Based Endpoint Threat Response, Whitepaper, 27 pages (Apr. 6, 2017).
International Search Report and Written Opinion dated Feb. 18, 2016 for International Application No. PCT/IL2015/050802, in 10 pages.
International Preliminary Report on Patentability dated Feb. 14, 2017 for International Application No. PCT/IL2015/050802, in 7 pages.
International Search Report and Written Opinion dated Apr. 20, 2017 for International Application No. PCT/IL2016/051110, in 10 pages.
International Search Report and Written Opinion dated Dec. 11, 2018 for International Application No. PCT/US2018/045850, in 12 pages.
International Search Report and Written Opinion dated Aug. 24, 2020 for International Application No. PCT/US2020/033872, in 8 pages.
International Search Report issued in application No. PCT/US2021/050129 dated Dec. 21, 2021.
International Search Report in corresponding International Patent Application No. PCT/US2015/29490, dated Aug. 7, 2015, in 2 pages.
Written Opinion in corresponding International Patent Application No. PCT/US2015/29490, dated Aug. 7, 2015, in 6 pages.
International Preliminary Report on Patentability in corresponding International Patent Application No. PCT/US2015/29490, dated Nov. 8, 2016, in 7 pages.
International Search Report in corresponding International Patent Application No. PCT/US2015/29501, dated Aug. 7, 2015, in 2 pages.
Written Opinion in corresponding International Patent Application No. PCT/US2015/29501, dated Aug. 7, 2015, in 6 pages.
International Preliminary Report on Patentability in corresponding International Patent Application No. PCT/US2015/29501, dated Nov. 8, 2016, in 7 pages.
International Search Report in corresponding International Patent Application No. PCT/US2015/61271, dated Feb. 2, 2016, in 2 pages.
Written Opinion in corresponding International Patent Application No. PCT/US2015/61271, dated Feb. 2, 2016, in 6 pages.
International Preliminary Report on Patentability in corresponding International Patent Application No. PCT/US2015/61271, dated May 23, 2017, in 7 pages.
Office Action dated Jul. 24, 2019 in European Patent Application No. 15760520.5, in 8 pages.
Office Action dated May 31, 2022 in Japanese Patent Application No. 2020-503272, in 7 pages.
Extended European Search Report dated Aug. 25, 2021 for European Patent Application No. 21162973.8, in 5 pages.

* cited by examiner

FIG. 13

SYSTEMS, METHODS AND DEVICES FOR DEVICE FINGERPRINTING AND AUTOMATIC DEPLOYMENT OF SOFTWARE IN A COMPUTING NETWORK USING A PEER-TO-PEER APPROACH

INCORPORATION BY REFERENCE TO ANY PRIORITY APPLICATIONS

This application is a continuation of U.S. application Ser. No. 17/471,822, filed Sep. 10, 2021, which claims the benefit of U.S. Provisional Application No. 63/126,162, filed Dec. 16, 2020, and titled SYSTEMS, METHODS AND DEVICES FOR DEVICE FINGERPRINTING, and U.S. Provisional Application No. 63/173,191, filed Apr. 9, 2021, and titled SYSTEMS AND METHODS FOR AUTOMATIC DEPLOYMENT OF SOFTWARE IN A COMPUTING NETWORK USING A PEER-TO-PEER APPROACH. Each of the foregoing applications is hereby incorporated by reference in their entirety.

Any and all applications for which a foreign or domestic priority claim is identified in the Application Data Sheet as filed with the present application are hereby incorporated by reference under 37 CFR 1.57.

BACKGROUND

Field

The embodiments herein are generally related to device or machine fingerprinting and software deployment in a computer network.

Description

Software deployment is a fundamental activity when managing one or several computers in a home environment or in a commercial company managing a fleet of computers. In a commercial environment, an information technology (IT) department is usually responsible for the inventory of applications and all software that is in use in the entire computer network. While software deployment and upgrade activities could be managed by individual users working on target endpoints, in most cases, the IT department controls the deployment process using centralized software management systems. A common system for managing Windows endpoints is System Center Configuration Manager (SCCM). However, every software system is unique, and the precise deployment processes or procedures vary from one piece of software or software version to another. Thus, in most cases, specific requirements or characteristics are defined for a specific deployment.

Peer-to-peer (P2P) computing or networking is a distributed application architecture that treats peers as nodes in a computer network, and uses those peers to lay out tasks, leveraging the connection between them. Peers are equally privileged, equipotent participants in the application. Peers are both suppliers and consumers of resources, in contrast to the traditional client-server model in which the consumption and supply of resources is divided. In order to perform remote connectivity and administrative actions on endpoints, whether from a centralized server or from another peer, credentials with administrative rights are needed.

In addition, in order to deploy software to peers, endpoint devices must be identified. Device fingerprinting is a method for combining certain attributes of a device, such as operating system information, the type and version of web browser being used, the browser's language setting and the device's IP address, to identify it as a unique device.

There are existing tools that address device fingerprinting, with different levels of efficacy. There are two main existing ways of gaining data for fingerprinting—active Fingerprinting, and passive Fingerprinting. Active Fingerprinting refers to the process of actively scanning a network, such as by sending address resolution protocol (ARP) pings, transmission control protocol (TCP) messages, or user datagram protocol (UDP) messages, and using their aggregated data to identify attributes of a device. The most common open-source tool using Active Fingerprinting is Nmap.

Passive Fingerprinting is most commonly used when a process is run on a Man-in-the-Middle (MitM) device, which attains substantially all packets regularly sent in a network and using them for identifying device attributes for fingerprinting. Common open-source tools for passive fingerprinting are Ettercap and p0f.

However, systems and methods for performing device fingerprinting without a MitM device or without performing extensive active scanning are not currently available. Although the problem of device fingerprinting has been known, there are no existing solutions that fit real life scenarios of visibility while not being MitM devices, and not spamming the network with extensive scans.

Novel systems and methods for device fingerprinting and deployment of software to nodes of a computer network are provided herein.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Some embodiments herein are directed to systems for device fingerprinting, the system comprising: one or more computer readable storage devices configured to store a plurality of computer executable instructions; and one or more hardware computer processors in communication with the one or more computer readable storage devices and configured to execute the plurality of computer executable instructions in order to cause the system to: collect, by one or more distributed software agents on one or more endpoint devices of a computer network, endpoint device data; transmit, from the one or more distributed software agents on the one or more endpoint devices, the endpoint device data to a central server; analyze, by the one or more distributed software agents or the central server, the endpoint device data to determine at least one of an operating system family, an operating system type, and an endpoint device role of at least one of the one or more endpoint devices, wherein analyzing the endpoint device data comprises: inputting the endpoint device data into a hierarchical machine learning model comprising: a first layer, the first layer configured to classify each of the one or more endpoint devices into an operating system family classification; a second layer, the second layer configured to classify each of the one or more endpoint devices of a classified operating system family into an operating system type classification; and a third layer, the third layer configured to classify each of the one or more endpoint devices of a classified operating system type into a device role classification, wherein each layer of the hierarchical machine learning model comprises: one or more machine learning sub-models, each sub-model configured to generate a classification of each of the one or more endpoint devices based on a subset of the endpoint device data; and a neural network, the neural network configured to utilize the classifications generated by each of the one or more sub-models to generate a layer classification of each of the one or more endpoint devices, the layer classification comprising the operating system family classification for the first layer, the operating system type classification for the second layer, and the device role classification for the third layer; and aggregate, by the one or more distributed software agents or the central server, the operating system family classification, the operating system type classification, and the device role classification for each of the one or more endpoint devices to generate a device fingerprint of each of each of the one or more endpoint devices.

In some embodiments, the endpoint device data comprises both passive broadcast data and active unicast data. In some embodiments, the passive broadcast data comprises broadcast protocol data including one or more of address resolution protocol (ARP), dynamic host configuration protocol (DHCP), server message block (SMB), simple service discovery protocol (SSDP), multicast domain Name system (mDNS), or simple network management protocol (SNMP). In some embodiments, the active unicast data comprises data obtained by scanning, by the one or more distributed software agents, open ports including one or more of secure shell (SSH), Telnet, hypertext transfer protocol (HTTP), hypertext transfer protocol secure (HTTPS), and remote desktop protocol (RDP).

In some embodiments, the one or more hardware computer processors are further configured to execute the plurality of computer executable instructions in order to cause the system to apply, by the one or more distributed software agents, one or more security protocols to the one or more endpoint devices based at least in part on the determined operating system family, operating system type, or endpoint device role. In some embodiments, the one or more hardware computer processors are further configured to execute the plurality of computer executable instructions in order to cause the system to apply, by the one or more distributed software agents or the central server, one or more labels to the endpoint device data based on one or more manual or automatically generated labeling rules prior to analyzing the endpoint device data.

In some embodiments, the one or more distributed software agents continuously collect the endpoint data or the network traffic data from the one or more endpoint devices. In some embodiments, the one or more hardware computer processors are further configured to execute the plurality of computer executable instructions in order to cause the system to access, by the one or more distributed software agents or the central server, one or more databases to collect additional endpoint device data comprising one or more of device media access control (MAC) addresses, operating system versions, device manufacturers, and granular physical device identifications.

In some embodiments, the one or more machine learning sub-models comprise XGBoost or another decision tree ensemble. In some embodiments, the neural network of each layer comprises a fully connected neural network. In some embodiments, the output of the neural network comprises a numerical result indicating the probability of an endpoint device having a specific OS family for the first layer, the probability of an endpoint device having a specific OS type for the second layer, and the probability of an endpoint device having a specific device role for the third layer, and wherein if the probability is above a predetermined threshold, the layer classification is generated.

Some embodiments herein are directed to computer implemented methods for device fingerprinting, the method comprising: collecting, by one or more distributed software agents on one or more endpoint devices of a computer network, endpoint device data; transmitting, from the one or more distributed software agents on the one or more endpoint devices, the endpoint device data to a central server; analyzing, by the one or more distributed software agents or the central server, the endpoint device data to determine at least one of an operating system family, an operating system type, and an endpoint device role of at least one of the one or more endpoint devices, wherein analyzing the endpoint device data comprises: inputting the endpoint device data into a hierarchical machine learning model comprising: a first layer, the first layer configured to classify each of the one or more endpoint devices into an operating system family classification; a second layer, the second layer configured to classify each of the one or more endpoint devices of a classified operating system family into an operating system type classification; and a third layer, the third layer configured to classify each of the one or more endpoint devices of a classified operating system type into a device role classification, wherein each layer of the hierarchical machine learning model comprises: one or more machine learning sub-models, each sub-model configured to generate a classification of each of the one or more endpoint devices based on a subset of the endpoint device data; and a neural network, the neural network configured to utilize the classifications generated by each of the one or more sub-models to generate a layer classification of each of the one or more endpoint devices, the layer classification comprising the operating system family classification for the first layer, the operating system type classification for the second layer, and the device role classification for the third layer; and aggregating the operating system family classification, by the one or more distributed software agents or the central server, the operating system type classification, and the device role classification for each of the one or more endpoint devices to generate a device fingerprint of each of each of the one or more endpoint devices. wherein the central server comprises a computer processor and an electronic storage medium.

In some embodiments, the endpoint device data comprises both passive broadcast data and active unicast data. In some embodiments, the passive broadcast data comprises broadcast protocol data including one or more of address resolution protocol (ARP), dynamic host configuration protocol (DHCP), server message block (SMB), simple service discovery protocol (SSDP), multicast domain Name system (mDNS), or simple network management protocol (SNMP). In some embodiments, the active unicast data comprises data obtained by scanning, by the one or more distributed software agents, open ports including one or more of secure shell (SSH), Telnet, hypertext transfer protocol (HTTP), hypertext transfer protocol secure (HTTPS), and remote desktop protocol (RDP).

In some embodiments, the one or more hardware computer processors are further configured to execute the plurality of computer executable instructions in order to cause the system to apply, by the one or more distributed software agents, one or more security protocols to the one or more endpoint devices based at least in part on the determined operating system family, operating system type, or endpoint device role. In some embodiments, the one or more hardware computer processors are further configured to execute the plurality of computer executable instructions in order to cause the system to apply, by the one or more distributed software agents or the central server, one or more labels to the endpoint device data based on one or more manual or automatically generated labeling rules prior to analyzing the endpoint device data.

In some embodiments, the one or more distributed software agents continuously collect the endpoint data or the network traffic data from the one or more endpoint devices. In some embodiments, the one or more hardware computer processors are further configured to execute the plurality of computer executable instructions in order to cause the system to access, by the one or more distributed software agents or the central server, one or more databases to collect additional endpoint device data comprising one or more of device media access control (MAC) addresses, operating system versions, device manufacturers, and granular physical device identifications.

In some embodiments, the one or more machine learning sub-models comprise XGBoost or another decision tree ensemble. In some embodiments, the neural network of each layer comprises a fully connected neural network. In some embodiments, the output of the neural network comprises a numerical result indicating the probability of an endpoint device having a specific OS family for the first layer, the probability of an endpoint device having a specific OS type for the second layer, and the probability of an endpoint device having a specific device role for the third layer, and wherein if the probability is above a predetermined threshold, the layer classification is generated.

Some embodiments herein are directed to systems for software deployment to one or more endpoint devices on a computer network, the system comprising: one or more computer readable storage devices configured to store a plurality of computer executable instructions; and one or more hardware computer processors in communication with the one or more computer readable storage devices and configured to execute the plurality of computer executable instructions in order to cause the system to: identify, by one or more distributed software agents on one or more endpoint devices or a central server, one or more target endpoint devices for deployment of one or more software applications; generate, by the central server, a package file and deployment configuration, the package file comprising the one or more software applications select, by the central server, at least one of the one of more software agents to deploy the package file to the one or more target endpoint devices; transmit, by the central server to the at least one software agent, a command to fetch the package file to be deployed to the one or more target endpoint devices; transmit, by the central server to the at least one software agent, one or more credentials via a deployment protocol; communicate, by the at least one software agent, with the one or more target endpoint devices using one or more communication protocols; and execute, by the at least one software agent, the package file according to the deployment configuration to install the one or more software applications on the one or more target endpoint devices.

In some embodiments, identifying the one or more target endpoint devices comprises fingerprinting the one or more endpoint devices via by scanning the computer network using the one or more distributed software agents. In some embodiments, the one or more target endpoint devices are identified based at least in part on a presence or a lack of presence of the one of more distributed software agents on the one of more target endpoint devices.

In some embodiments, generation of the package file and deployment configuration is based at least in part on a user selection of the one or more software applications and deployment configuration parameters. In some embodiments, selection of the at least software agent is based at least in part on a user selection of the one or more software applications and deployment configuration parameters. In some embodiments, the selected at least one software agent comprises a software agent that detected the one or more target endpoint devices via passive or active scanning. In some embodiments, the selected at least one software agent comprises a software agent that communicated with the one or more target endpoint devices in secure shell protocol (SSH) or windows remote management (WinRM). In some embodiments, the selected at least one of the one of more software agents comprises a software agent from the same active directory (AD) Domain as target endpoint device.

In some embodiments, ein the package file is transmitted as an extension that the at least one agent is configured to download from a cloud database. In some embodiments, the one or more hardware computer processors are further configured to execute the plurality of computer executable instructions in order to cause the system to: retrieve, by the at least one software agent, log data from the one or more target endpoint devices; and transmit, by the at least one software agent, the log data to the central server.

In some embodiments, the one or more hardware computer processors are further configured to execute the plurality of computer executable instructions in order to cause the system to generate, by the central server, a map of the one or more endpoint devices and the one or more distributed software agents. In some embodiments, the map comprises a representation of possible deployment routes to and from the one or more endpoint devices on the computer network.

Some embodiments herein are directed computer implemented methods for software deployment to one or more endpoint devices on a computer network, the method comprising: identifying, by one or more distributed software agents on one or more endpoint devices or a central server, one or more target endpoint devices for deployment of one or more software applications; generating, by the central server, a package file and deployment configuration, the package file comprising the one or more software applications; selecting, by the central server, at least one of the one of more software agents to deploy the package file to the one or more target endpoint devices; transmitting, by the central server to the at least one software agent, a command to fetch the package file to be deployed to the one or more target endpoint devices; transmitting, by the central server to the at least one software agent, one or more credentials via a deployment protocol; communicating, by the at least one software agent, with the one or more target endpoint devices using one or more communication protocols; and executing, by the at least one software agent, the package file according to the deployment configuration to install the one or more software applications on the one or more target endpoint devices, wherein the central server comprises a computer processor and an electronic storage medium.

In some embodiments, identifying the one or more target endpoint devices comprises fingerprinting the one or more endpoint devices via by scanning the computer network using the one or more distributed software agents. In some embodiments, the one or more target endpoint devices are identified based at least in part on a presence or a lack of presence of the one of more distributed software agents on the one of more target endpoint devices.

In some embodiments, generation of the package file and deployment configuration is based at least in part on a user selection of the one or more software applications and deployment configuration parameters. In some embodiments, selection of the at least software agent is based at least in part on a user selection of the one or more software applications and deployment configuration parameters. In some embodiments, the selected at least one software agent comprises a software agent that detected the one or more target endpoint devices via passive or active scanning. In some embodiments, the selected at least one software agent comprises a software agent that communicated with the one or more target endpoint devices in secure shell protocol (SSH) or windows remote management (WinRM). In some embodiments, the selected at least one of the one of more software agents comprises a software agent from the same active directory (AD) Domain as target endpoint device.

In some embodiments, the package file is transmitted as an extension that the at least one agent is configured to download from a cloud database. In some embodiments, the one or more hardware computer processors are further configured to execute the plurality of computer executable instructions in order to cause the system to: retrieve, by the at least one software agent, log data from the one or more target endpoint devices; and transmit, by the at least one software agent, the log data to the central server.

In some embodiments, one or more hardware computer processors are further configured to execute the plurality of computer executable instructions in order to cause the system to generate, by the central server, a map of the one or more endpoint devices and the one or more distributed software agents. In some embodiments, the map comprises a representation of possible deployment routes to and from the one or more endpoint devices on the computer network.

BRIEF DESCRIPTION OF THE DRAWINGS

The drawings are provided to illustrate example embodiments and are not intended to limit the scope of the disclosure. A better understanding of the systems and methods described herein will be appreciated upon reference to the following description in conjunction with the accompanying drawings, wherein:

FIGS. 6-13 illustrate example configurations of a user interface for deploying software according to some embodiments herein.

DETAILED DESCRIPTION

Figure 1:
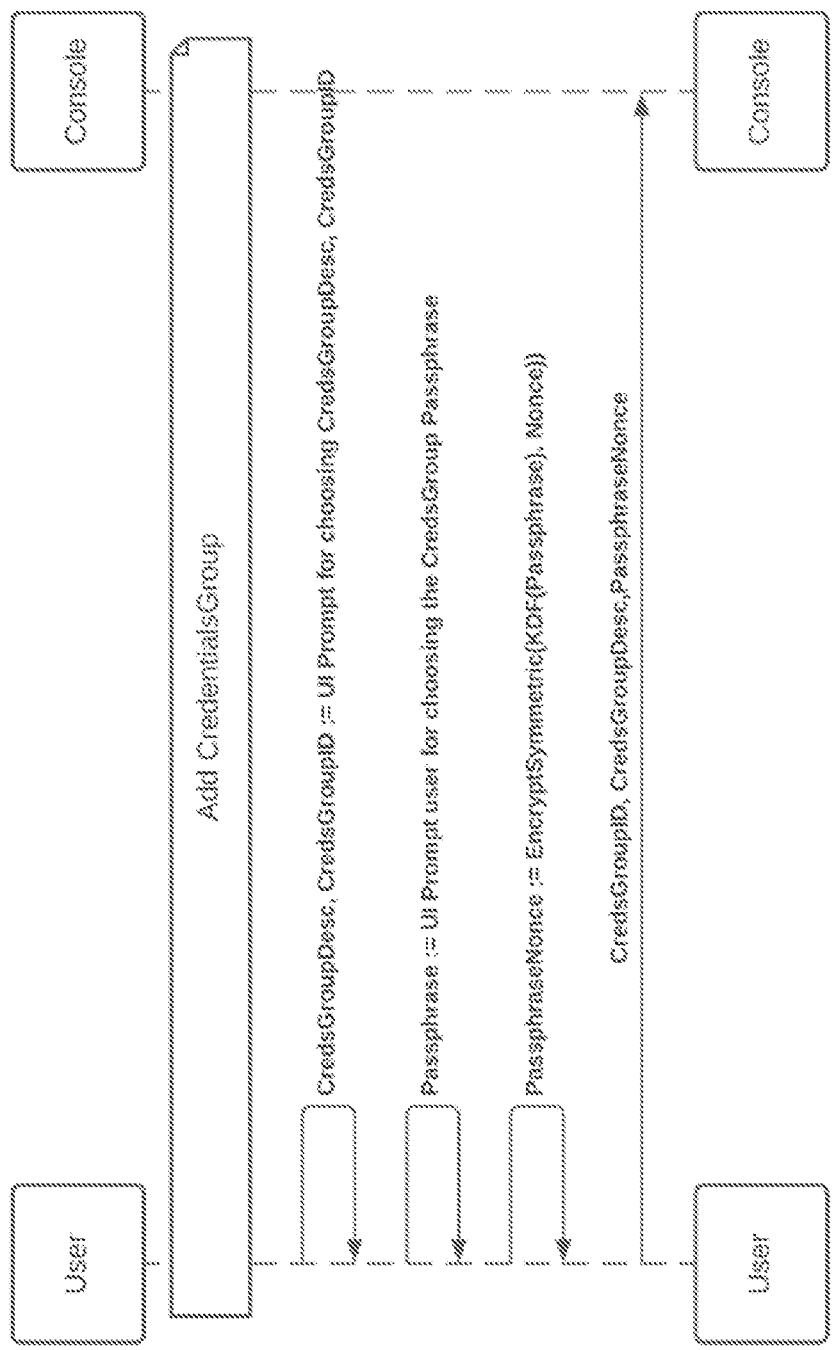
FIG. 1 illustrates a flowchart of an example credentials group creation process according to some embodiments herein.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present technology.

Described herein are systems and methods for automatic and dynamic software deployment to one or more endpoints on a computer network. Deploying software is a difficult problem and requires a delicate balance between usability and security. Existing solutions often fail on both accounts. Using widely deployed security agents, machine-learning capabilities, a user-friendly dynamic user interface, and a security-first approach, the embodiments herein provide a much more reliable, fast and secure solution than the existing alternatives. In some embodiments, a software deployment may originate from a centralized server or command and promulgate through one or more peers of a peer-to-peer network. However, although the embodiments herein are generally described in connection with peer-to-peer deployment of software, the embodiments herein may also be utilized in a centralized deployment configuration, such as in an active directory (AD) deployment or a System Center Configuration Manager (SCCM) deployment.

The embodiments for software deployment described herein improve on existing software deployment methods in various ways. In some embodiments, the automatic deployment systems and methods described herein may utilize improved device fingerprinting methods, which provide more comprehensive information on the devices on which software is to be deployed. Conventionally, network management administrators will not be aware of every endpoint in a computer network or subnetwork. Device fingerprinting enables users to scan a network to identify and classify endpoints of the network. In some embodiments, device fingerprinting may be facilitated by the distributed, passive and active scanning mechanisms of embedded software agents installed on endpoints of the computer network. In some embodiments, device fingerprinting may be enabled by a machine learning (ML) based fingerprinting engine, which utilizes data retrieved by the embedded software agents. The effect of improved device fingerprinting is an enhanced ability to decide which endpoints require software deployment, and increased likelihood of succeeding in such deployments.

Device Fingerprinting

Disclosed herein are embodiments of methods, devices and systems for device fingerprinting. In some embodiments, network identifiers (e.g., headers, protocol versions, passive network information such as broadcasts and multicasts) may be used to train Machine Learning (ML) models that determine a device's operating system family, operating system version, and/or device role. In some embodiments, the systems and methods herein may discern network device information, such as device type (e.g., printer, router, desktop, server, etc.) and operating system (e.g., embedded Linux, Windows, etc.), by analyzing what a device broadcasts or how a device responds to active scanning. In some embodiments, a combination of passive monitoring and limited active scanning may be utilized. The systems, devices, and methods described herein can be distinguished from existing solutions in at least the below-described ways.

In some embodiments herein, the systems, devices and methods do not comprise fully active or fully passive fingerprinting. Instead, the fingerprinting systems, methods, and devices address real-world scenarios where attainable data is limited. For example, in some embodiments, the fingerprinting device used herein may not comprise a MitM device, such that the fingerprinting device may passively collect only broadcast data packets, rather than substantially all packets regularly sent in a network. Furthermore, because comprehensive active scans may severely affect client device performance and may be impossible due to network firewalls or other restrictions, the fingerprinting devices and systems herein may not perform fully active fingerprinting.

In some embodiments, the fingerprinting systems, methods, and devices involve inclusion of diversified labeled data. For example, in some embodiments, "1$^{st}$ party" data may be obtained from client devices on which a software agent is installed, mainly Windows computers, Linux distributions or MacOS computers. In certain embodiments, the systems disclosed herein can be configured to utilize installed agents on client devices or endpoints. In certain embodiments, the agents can be configured to analyze processes and/or network traffic occurring on an endpoint. In certain embodiments, the agents can be configured to transmit such analysis data to a central computing server system. In certain embodiments, the central computing server system can be configured to analyze the data to perform fingerprinting according to the embodiments herein. In certain embodiments, the agents are configured to independently analyze the data to perform device fingerprinting for the endpoint on which they are installed without involvement of the central server. In certain embodiments, both the agents and the central server are configured to perform such fingerprinting analysis of the endpoints. In certain embodiments, artificial intelligence (AI) and/or ML techniques are employed by the agent and/or the central server to perform such fingerprinting analysis.

In certain embodiments, the system comprises a plurality of agents operating on a plurality of endpoints within an elastic network. However, in some embodiments, agent plurality in a network is not a requirement. For example, the systems and methods herein may scan in "adverse" situations such as a single agent in a network, or even from other nearby sub-networks wherein agents are absent in the local subnet. In some embodiments, a local subnet may comprise an L3/24 classless inter-domain routing (CIDR). In some embodiments, the systems and methods may scan locally for a multitude of reasons, including data quality, avoiding disruptive equipment in the way such as firewalls/Intrusion Detection Systems (IDS)/Intrusion Prevention Systems (IPS), and minimizing network impact while maximizing distributed efficiency and minimizing both per-scan latencies and system latency as a whole. In certain embodiments, the plurality of agents operating on a plurality of endpoints communicate with the central server and/or perform the same fingerprinting analysis disclosed herein. In certain embodiments, the systems disclosed herein are configured to identify or model a subset or substantially all of the plurality of endpoints on the network. In certain embodiments, the systems disclosed herein can be configured to automatically and/or dynamically identify and group endpoints to various determined groupings of the plurality of endpoints. In some embodiments, the systems, through embedded agents at endpoint devices, which can include, without limitation, other systems, servers, computers, virtual machines, or the like, have the ability to monitor the endpoint devices and apply policies at the individual endpoint level based on the fingerprinting. In some embodiments, the embedded agents act as a continuous data collection tool, such that fingerprinting can be continuously implemented across the network or completed at various points in time.

In addition to data obtained from agents installed on endpoint device, "third party" data sources, such as databases, may be utilized to provide information about, for example, Internet of Things (IoT) devices. The third-party data may comprise device media access control (MAC) addresses, OS Version, Manufacturer, and granular physical device identification if possible. In some embodiments, a manually generated set of rules may be used to tag at least a portion of the obtained data for use in one or more ML models. However, in some embodiments, at least a portion of the obtained data does not have any labels.

In some embodiments, a hierarchical ML model, based on, for example, XGBoost and Neural Networks (NNs), may be utilized for device fingerprinting. XGBoost is an optimized distributed gradient boosting library designed to be highly efficient, flexible and portable. It implements ML algorithms under the Gradient Boosting framework. XGBoost provides a parallel tree boosting (also known as gradient-boosted decision trees (GBDT), gradient boosting machine (GBM)) that solves many data science problems in a fast and accurate way.

NNs are non-linear statistical data modeling or decision-making tools. They can be used to model complex relationships between inputs and outputs or to find patterns in data. In some embodiments, the hierarchical ML model may utilize semi-labeled data to generate new labeling rules from existing manual rules in a way that prevents overfitting of the ML model. Overfitting refers to a ML model that models its training data too well, to the detriment of the accuracy of the model with respect to inference of real data. Overfitting happens when a model learns the detail and noise in the training data to the extent that it negatively affects the performance of the model on new data. This means that the noise or random fluctuations in the training data is picked up and learned as concepts by the model. One problem with overfitting is that these concepts do not apply to new data and negatively influence the model's ability to generalize.

In some embodiments, new labels are generated in the following manner: information may be collected from one or more different scanners (e.g., multicast domain name service (mDNS), address resolution protocol (ARP), port scans, etc.) and labels may be generated from the combined data using manually created rules, MAC address tables, and/or agents installed on the devices. For certain endpoints which have enough data from different scanners, data may be removed from some scanners to create artificially limited training samples, but labels generated from the unified data may be retained. For example, for a sample with a MAC address and mDNS information, a very accurate label can be generated because MAC provides the vendor, and that information alone is often enough to provide identification information. However, it is undesirable for the ML model to overfit on MAC address data, so in some embodiments, the MAC address features may be removed from the sample. The label generated from the unified data may be retained. In this way, the model can be trained on other, less obvious features for that label, such as the mDNS features.

In some embodiments, the fingerprinting methods, devices, and systems described herein are more granular than existing fingerprinting solutions. Fingerprinting according to the embodiments herein involves not only differentiating between families of operating systems (OS) (such as Windows and Linux), but also differentiates the OS version (such as "Windows 10 and Windows XP"), and also the "role" or "type" of device (e.g., "Windows 10 Server", "Linux Embedded Camera", or "AppleTV"). In some embodiments, the fingerprinting systems, devices, and methods described herein may provide such attribute identification with much more accurate results than other known methods, having an attribute identifying accuracy of at least 97%.

In some embodiments, software agents may be installed and run-on endpoint devices, and may be configured to perform limited scans of the network, provide fingerprinting data, and analyze the data using ML models to identify device attributes. Many of the existing passive fingerprinting methods rely on having a MitM in the network, and significantly rely on sniffing unicast transmission control protocol (TCP) and hypertext transfer protocol (HTTP)/Secure Sockets Layer (SSL) packets. On the other hand, many of the existing active fingerprinting methods have issues that affect their effectiveness. For example, existing active methods rely on the ability to scan a relatively large number of network ports, which is undesirable as doing so may have a significant effect on endpoint performance and may be limited by network firewalls and other restrictions. Furthermore, existing active methods require unicast communication between the installed software agents and the target device, which may not be possible in many networks that have firewalls or different routing rules.

Additionally, existing methods do not provide a high level of granularity, which may be desired in certain embodiments. Because many of the existing methods were created before certain operating systems were created, much of their differentiating techniques between, for example, Windows and non-Windows devices, are not effective. Existing methods lack differentiations between all operating systems (e.g., knowing the specific Windows version, finding tvOS devices, differentiating between Ubuntu and Debian, etc.). Existing methods also lack a device role classification (i.e., the ability to know if a Windows computer is a workstation or Windows Server or finding whether a Linux device is a camera or a printer (or any other network "role")).

Network Data Collection

As noted above, according to some embodiments herein, the data collected by the fingerprinting systems and devices may comprise both passive broadcast data and active unicast data. For example, broadcast information for specific informative protocols, such as address resolution protocol (ARP), dynamic host configuration protocol (DHCP), server message block (SMB), simple service discovery protocol (SSDP), multicast domain Name system (mDNS), and simple network management protocol (SNMP) may be collected passively. In some networks, active scanning of some devices is possible, such that open ports, such as secure shell (SSH,) Telnet, HTTP, hypertext transfer protocol secure (HTTPS), and remote desktop protocol (RDP) may be scanned. In some embodiments, other data sources include protocols such as TCP and user datagram protocol (UDP) (or other L4 protocols), and L7 (application layer) data, where software running on devices is used to obtain data points. Active measures for service fingerprinting may also be implemented in protocols such as SSDP or mDNS, especially where more information of devices who publish services through the protocol is required. In some embodiments, the above data points and others may be aggregated and inputted to a ML to fingerprint the device by identifying one or more attributes of the device.

Data Labeling

In some embodiments, a supervised or semi-supervised ML model according to the embodiments herein may require at least a semi-labeled dataset. A labeled probabilistic data set may be created through aggregation of one or more types of results.

In some embodiments, manual rules may be created and utilized to provide classification of some devices. For example, if a device has OSVersionMajor=10 in SMB, it may be classified as a Windows 10 device. In another example rule, if a device has "Ubuntu" in its SSH banner, it may be classified as an Ubuntu device. In yet another example rule, if a device had USER_AGENT=MacOS, it may be classified as a MacOS device. In some embodiments, those rules may be effective to a limited extent, but more than 50% of total devices (and especially non-Windows devices) may remain unknown using only manual rules. In some embodiments, manual rules may be effective at classifying a device OS family (such as Linux vs Windows vs Cisco vs Apple), but not the specific OS name or device role.

In some embodiments, in addition to manual rules, installed software agent data may be used to classify devices. For example, in some embodiments, each agent may report its endpoint device operating system information to the central server or another fingerprinting device or system. In some embodiments, the agents may also perform scans of such endpoint devices. In some embodiments, the data obtained via scans may be effective for labeling workstations or servers but may be less effective for labeling IoT or mobile devices.

Additionally, third party data sources based on MAC address mapping may be utilized. For some devices, there is a possibility of identifying the specific device through its MAC address. For example, third party data may be effective at identifying an iPhone from an Apple organizationally unique identifier (OUI), or even an iPhone version specifically. In another example, a Hewlett-Packard (HP) device may be identified as an HP computer or HP printer using third party data. As yet another example, third party data may be used to classify devices such as cameras, routers or solar panels. In some embodiments, this approach using third party data may be effective for devices with a known MAC address, and for those devices, it may be particularly effective for IoT or mobile devices and less so for workstations or servers—since, for example, knowing the hardware is HP computer does not mean it runs a particular OS. The third-party data classification approach may be limited when used alone. However, in some embodiments, the most significant impact of third-party data is the utilization of such labelled data to train the ML models, especially with respect to workstations and servers.

However, when combining datasets from partially passively obtained data, partially actively obtained data, third party data, a high quality, high coverage, and high resolution labeled data set can be obtained to create and train a ML model.

Model Architecture

In some embodiments, the ML model may be designed around the hierarchical labeling structure comprising an OS family→OS name→device role/type. This structure may be integrated into the ML architecture and thus create a model that is more fitted to the labelled data.

As described above, in some embodiments, manual rules may be used to create labels for some devices. However, in some embodiments, the ML model may be structured to avoid overfitting the manual rules, as the model should function to generalize those rules and to create new rules.

Additionally, the ML model may be structured to take into account the MAC address data. In the same way as the manual rules, it is undesirable for the ML model to overfit on specific MAC address prefixes, as that also prevents the generalization of roles to new devices.

In some embodiments, the ML model may be structured and designed to account for the fact that the labels may be unbalanced. For example, if the training data has ten times (or more) data points for Windows devices than all other device data points combined, the model must be designed around the training data. For example, the ratio of Windows to non-Windows devices changes significantly in different data pools. For example, within specific scanners (such as SSH or HTTP), there are more Linux devices than Windows devices. If a common, off-the-shelf approach is used for ML model training, overfitting will occur in multiple areas and very poor results would be obtained. The problem is that training data is heavily skewed, such that it is very hard to remedy the training data without already having a huge and diverse training database. Furthermore, the ML model needs to be very robust at inference because of noise and missing data. For example, a firewall could block an important port or broadcast or make it appear that every endpoint is up, and a certain port is open. Furthermore, an endpoint may provide incorrect information about its OS in a server banner.

Additionally, in some embodiments the variance of user networks must be considered. In some embodiments, because different networks have different configurations, different firewalls, and different servers, the ML model needs to be trained on different networks in order to correctly label devices on real networks.

As such, the ML model may comprise a hierarchical model comprising 1) an upper layer—which only classifies between OS families; 2) a middle layer—that for each OS family classifies between different operating systems; and 3) lower layer—that for each operating system classifies the device role or type. In some embodiments, a hierarchical model may perform better than a general "all labels" classifier, or an aggregation of binary classifiers.

In some embodiments, because of the data structure and the variance in networks, a hierarchical ML model may be more effective. In each layer, all data features of all scanners may not be used together, but rather separated into different "scanner models." In some embodiments, the different scanner models may comprise "sub-models" which each specialize in a particular, limited dataset. The predictions of these "sub-models" may be stacked together and ultimately blended with a neural network for an overall classification. In some embodiments, the results of the various scanner models may be aggregated. The output of the sub models may comprise each sub-model's prediction, which may comprise a numerical value representing what label the model determines as the most likely correct label. This technique of aggregating the scanner model outputs is sometimes called stacking or blending. Specifically, as mentioned above, one or more neural networks may be used as an "aggregation mechanism" for the scanner models' results. In some embodiments, the neural network's inputs may comprise the outputs from the scanner models (of that level), and the neural network's output may comprise the final output of the level. In some embodiments, this prevents overfitting of the manual rules—for example, for each scanner, there may be a large number of labels that are untagged because of manual rules connected to the specific scanner. Therefore, generalization may be necessary, and overfitting will not be sufficient (and therefore will not occur as frequently). In some embodiments, the above structure allows the unbalanced data to be addressed twice—once for each scanner and once again in the aggregation of the scanner model results. In this way, an undesirable weighing toward a specific OS with respect to a specific scanner is not created within the model, but also no undesirable weighing towards another OS is created in the general classification. Thus, there are at least two different types of biases addressed by the model structure. The first is the unbalanced nature of the training data, and the second is the unbalancing of the devices that have a specific scanner result (e.g., devices where the SSH port is open and scanned). The nature of the bias in both instances can be different (e.g., generally there are more Windows devices, but if SSH is scanned, then there are more Linux devices). If only the first problem is addressed, the detrimental effect of second one is enhanced. If only the second problem is addressed, the first problem is still not solved. Therefore, the proposed model and training data structure is designed to address both biases to create a robust and accurate classification model.

Additionally, for each scanner model, XGBoost or any other decision tree ensemble may be used, as described above. This method is similar to "Decision Tree" methods, in which observations about an item (represented in the branches) are transformed to conclusions about the item's target value (represented in the leaves). However, for the embodiments described herein, since multiple unique paths to each label are desired, and since overfit must be avoided, ensemble models and XGBoost specifically may be superior.

In some embodiments, to aggregate all the scanner models to a ML final layer decision, a dense NN may be utilized. A dense NN comprises a model in which layers are fully connected (dense) by the neurons in a network layer. Each neuron in a layer receives an input from all the neurons present in the previous layer—thus, each layer is densely connected. In some embodiments, this model is desired as the different relations between different scanner results is not trivial, but the number of variables is small enough such that a dense network is possible.

In some embodiments, in the model training process, an "augmented data set" may be added, in which some scanners are not present for each device. Because of the nature of the labels—both in the manual rules and in the MAC address-based labeling—devices that have a certain a scanner are more likely to have labels, while devices that do not have those scanners are much more likely to be unknown. Because unknown devices are the most important to identify using the ML model, in some embodiments, the model may be trained and tested on such unknown devices. Thus, in some embodiments, for devices with relatively large numbers of scanners, a portion of the scanners may be removed, such as the ARP scanner with the MAC address. However, in some embodiments, the label may be retained, such that labeled data may be obtained for such a device. In some embodiments, this model configuration may function well because it may be assumed that the lack of scanners in many cases is only because of network configuration/firewalls, and not because of an inherent difference between the devices.

Figure 15:
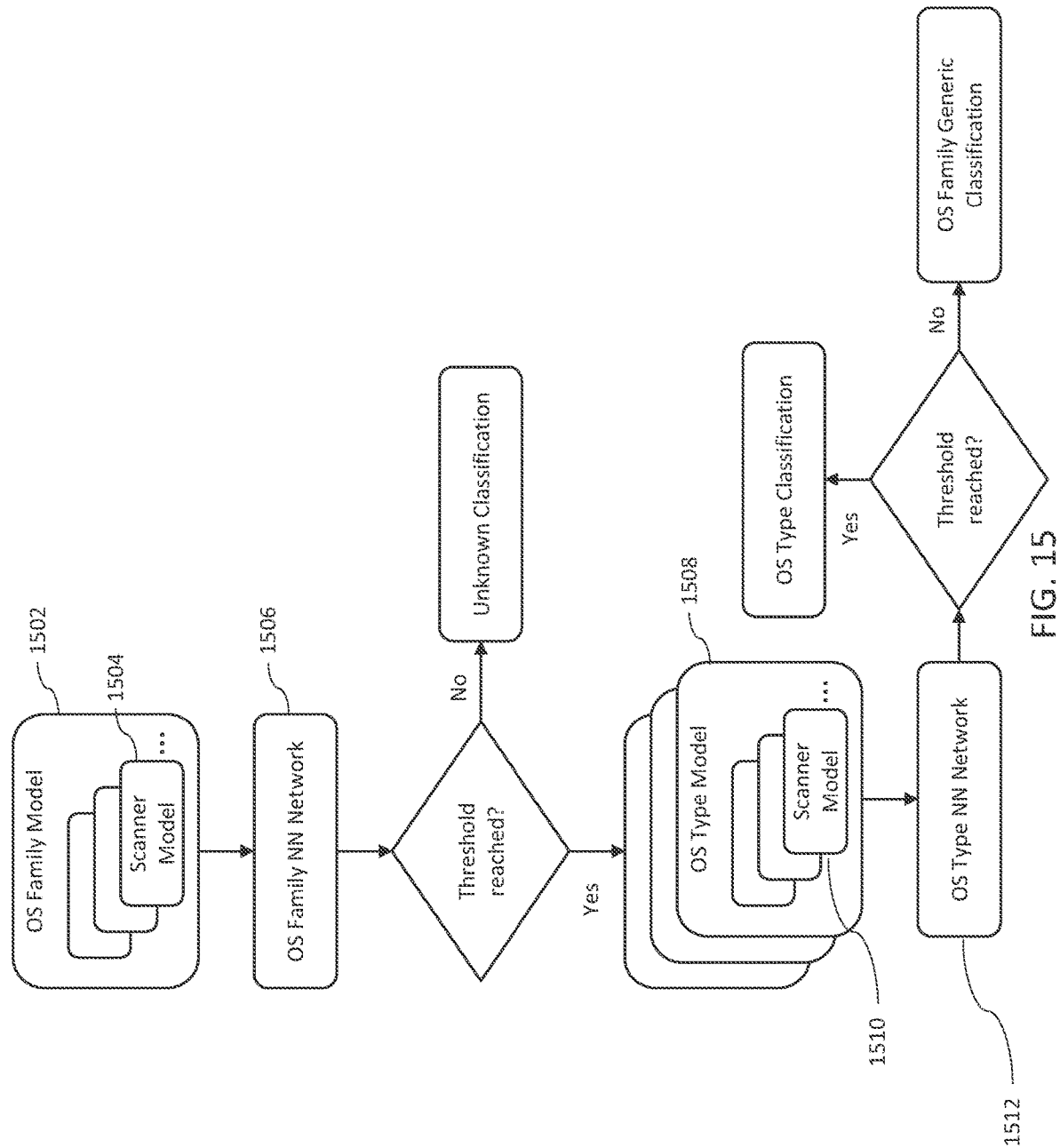
FIG. 15 illustrates an example diagram of a machine learning model structure according to some embodiments herein.

FIG. 15 illustrates an example diagram of a ML model structure according to some embodiments herein. As illustrated, the ML model comprises a hierarchical structure comprising an OS family model 1502 comprising one or more scanner models 1504, which are aggregated and used as an input to an OS Family NN model 1506. In some embodiments, the output of the NN comprises a numerical result indicating the probability of the device having a specific OS family, such as Apple, Linux, or Windows. If the probability is above a predetermined threshold, the output is inputted into one or more OS specific models 1508, which may comprise one or more OS specific scanner models 1510. If the probability is below the predetermined threshold, the device may be tagged as unknown.

In some embodiments, one or more scanner model outputs may be inputted into an OS specific NN model 1512. The output of the OS specific NN model may comprise a numerical result indicating the probability of the device having a specific OS type within the OS family of the OS specific model 1510. If the result is above a predetermined threshold value, it may be used to identify the OS type within the OS family. If the result is below the predetermined threshold value, the device may be given a generic OS type tag within the OS family identified. In some embodiments, a model as described herein may predict the OS family of an endpoint device. If a family can be predicted, the features are given to a model for that particular OS family which predicts the OS type (e.g., for Linux that would be Ubuntu, Debian, etc.). In some embodiments, a device role may also be predicted, or for Linux distributions, a specific distribution may be classified, as shown in FIG. 16.

Figure 16:
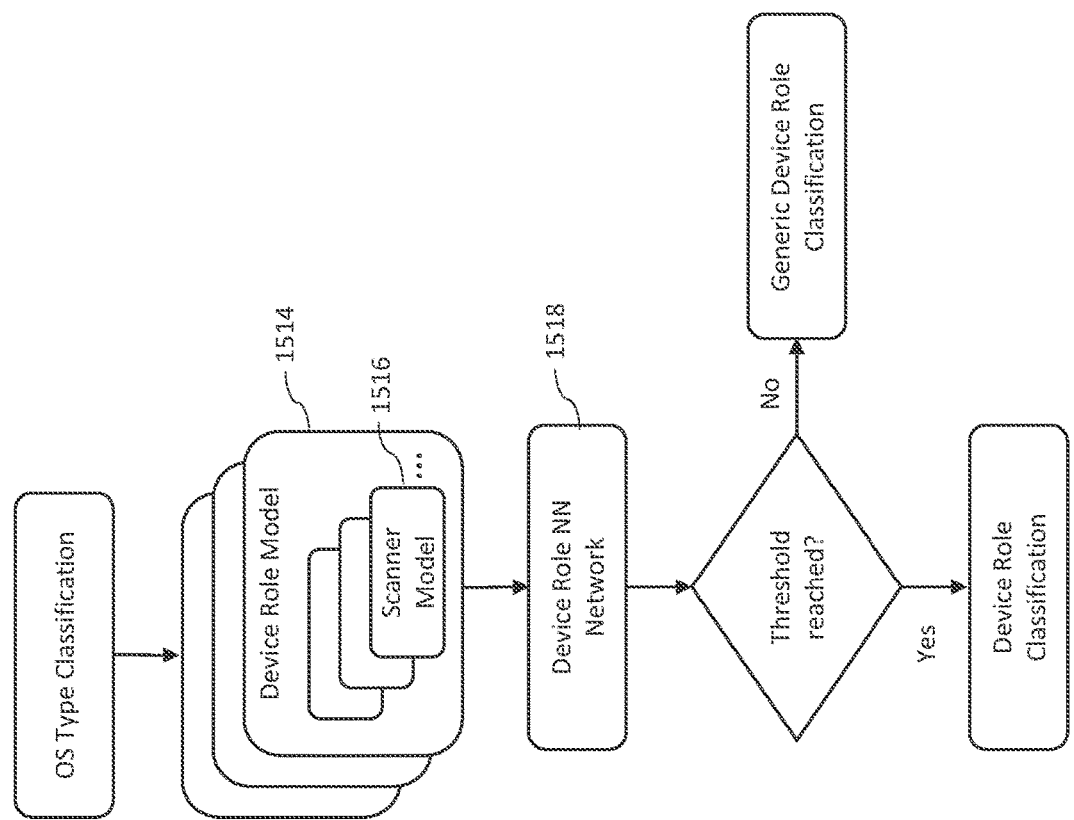
FIG. 16 illustrates an example diagram of a ML model structure for predicting device role according to some embodiments herein.

FIG. 16 illustrates an example diagram of a ML model structure for predicting device role according to some embodiments herein. In some embodiments, if an OS family and an OS type are identified, the device role may be predicted using a similar ML model as that illustrated in FIG. 15. For example, if the result of the OS specific NN model 1512 is above a predetermined threshold value, it may be used to identify the device role. For example, as illustrated in FIG. 16, the output may be inputted to one or more device role models 1514, which may comprise one or more device role specific scanner models 1516. In some embodiments, one or more scanner model outputs may be inputted into a device role NN model 1518. The output of the device role NN model may comprise a numerical result indicating the probability of the device having a specific role. If the result is above a predetermined threshold value, it may be used to identify the device role. If the result is below the predetermined threshold value, the device may be given a generic device role tag within the OS type identified.

Results

In some embodiments, the above-described ML model may outperform existing fingerprint methods in both accuracy and in granularity. In some embodiments, the ML model may identify an OS Family with at least 99% accuracy, the Specific OS with at least about 97% accuracy, and the Device Role with at least 95% accuracy.

Peer-to-Peer Auto-Deployment

In addition to improved device fingerprinting, the embodiments herein may comprise a dynamic deployment selection process for selecting certain endpoints and embedded agents, noted as "deployers" herein, from which software may be deployed to target endpoints. The deployer selection process described herein is significantly more sophisticated and automated than most existing solutions, which may require manual selection of deployers. The selection process described herein contemplates characteristics of the endpoint machines and the network as a whole to make the process as simple, efficient and fast as possible.

Furthermore, as opposed to many existing solutions, the deployment systems and methods described herein may ensure that credentials are protected via end-to-end encryption such that they are hidden from both the owner of the deployed software and low-privileged users. In some embodiments, the usage of credentials in the deployer is completed in a protected manner, such that other processes would be unable to access the credentials.

In every deployment scheme, guarding credentials to the network endpoints is extremely important and there may be various factors to consider in generating a security structure for deployment. Increased sharing of credentials increases the potential for improper credential exposure. Therefore, in some embodiments, access to credentials may be limited to the greatest extent possible. For example, in some embodiments, where backend servers of a software developer/owner ("security vendor") are external to a network organization, the servers should never have access to organization credentials. Allowing the security vendor to have access to credentials of a user may expose those credentials upon an exposed vulnerability of the security vendor's systems, which would then expose the network to potential attack. In addition to isolating the credentials from the security vendor, credentials may also be protected from a user's browser during deployment. In many cases, there are different objectives between the IT organization (which require credentials to deploy software), and the network security policy (which seeks to limit credentials exposure). Moreover, in some embodiments, only limited personnel within the IT organization should have access to the credentials, while other personnel should be enabled to deploy software without knowing the credentials themselves. Furthermore, in some cases, malicious browser extensions exist and steal all information that exists in the browser. Thus, it is important to minimize the exposure of the credentials to the browser. Additionally, in some embodiments herein, credentials may be provided to a deploying agent ("deployer") on an endpoint. In some embodiments, those credentials must not be exposed on the endpoint on which the deployer resides. In some cases, the deployer's endpoint could conceivably be compromised, and the credentials may be exposed if not guarded properly.

As such, in some embodiments, the deployment system herein acts as a depository of credentials, providing end-to-end encryption. This is a key differentiator between existing solutions and the embodiments described herein. In many of the existing solutions, there are minimal mitigations against exposure of credentials to various organizations and devices, creating an enormous security risk to the most important security asset of each organization—the admin credentials for all the endpoints in the network. In some cases, the lack of encryption in existing solutions also requires credentials to be stored on premise to remain secure, instead of within a cloud database, making existing options less usable, more costly and less secure.

In some embodiments herein, software may be automatically deployed in a P2P method. In case of a cyberattack, the communication of network endpoints to a software deployment server may be compromised as the server, the endpoint, or an intervening network device could be the target of the attack. In such cases, while traditional deployment systems would be unable to function, the embodiments herein may enable software deployment, remote connectivity, and software management via communication between nodes in the network. These functions are critical for the IT health of an organization following a cyberattack.

In some embodiments, software deployment may comprise one or more of the following steps. In some embodiments, the deployment process may comprise discovery of one or more endpoints for which deployment of one or more software applications may be needed. This discovery process may comprise device fingerprinting according to the systems and methods described herein. Upon discovery and identification of one or more endpoints of the network, a target selection process may be initiated, in which one or more of the discovered endpoints is selected as a target of deployment. In some embodiments, these target endpoints may comprise endpoints for which a distributed security software agent has not been installed. These agents may comprise agents with a variety of functionalities as described in U.S. patent Ser. No. 16/058,810, titled METHODS, SYSTEMS, AND DEVICES FOR DYNAMICALLY MODELING AND GROUPING ENDPOINTS FOR EDGE NETWORKING, the entirety of which is hereby incorporated by reference. In some embodiments, these agents are deployed and executed on endpoint devices, and comprise functionality to both scan and fingerprint devices on the network. In some embodiments, the scanning and fingerprinting functionality of the agents may enable the identification of endpoint types, operating systems (OS) and OS versions of substantially all endpoints of the network. In some embodiments, the agents may be configured to identify one or more applications running on the identified endpoints. In some embodiments, this fingerprinting process is completed via both active and passive scanning. In some embodiments, fingerprinting may be completed in a distributed manner, using deployed agents on one or more networks or subnetworks. In some embodiments, the results and data retrieved via scanning may be provided to a custom ML model, which analyzes the results and outputs accurate fingerprinting predictions.

In some embodiments, fingerprinting results may be stored to create a complete "connectivity image" or map of the network endpoints and deployed agents, which holds all possible routes to and from substantially all endpoint devices in the network. In some embodiments, this connectivity image allows for better selection of deploying machines during the deployment process.

In some embodiments, a user may use the fingerprinting data and ML model results to view an inventory of endpoint devices. In some embodiments, the system may identify one or more endpoint devices as unmanaged devices, which may be divided into a few categories. For example, "unsecured" devices may comprise endpoint devices on which an agent may be deployed, but on which an agent has not yet been deployed. Such devices may include, but are not limited to, Windows workstations and servers, Linux workstations and servers, and Apple MacOS devices. In some embodiments, the user may select one or more unsecured devices for deployment. Alternatively, in some embodiments, one or more target endpoint devices may be automatically selected by the system for deployment.

Upon selection of one or more target endpoints, a package file selection process and deployment configuration may be dynamically generated to determine the specific software applications and configuration to be deployed on the one or more target endpoints. In some embodiments, a user may select a software version to be installed for each operating system and architecture. Moreover, the user can configure proxy settings, whether to force reboot on the target endpoint or provide additional parameters. In some embodiments, the deployment configuration and parameters may be automatically selected based on characteristics of the target endpoint. In some embodiments, the selected software applications may be deployed according to the specified configuration to the one or more target endpoints via one or more software agents installed on one or more other peer endpoints of the network. These existing software agents, called deployers, may be automatically and dynamically selected to optimize and simplify the deployment of the selected software applications to the one or more target endpoints.

In some embodiments, selection of the optimal deployers may be completed automatically and dynamically by the system. In some embodiments, the choice of deployers is a crucial step that contributes to faster, more secure deployment. Optimal selection of deployers increases the chance of success in deployment, which in turn reduces the number of devices to which credentials may be provided and reduces potential risk of exposure.

Various considerations may be taken into account in the selection of deployers for any given deployment. For example, agents that recently detected the target endpoint via passive or active scanning and/or communicated with the target endpoint in secure shell protocol (SSH) or windows remote management (WinRM) are more likely to perform successful connectivity with the target device and may be given deployment priority.

In some embodiments, when deploying to Windows-based target endpoints, deployers from the same active directory (AD) Domain as target endpoint may be selected. In some embodiments, when the target endpoint is a Windows-based target endpoint and information on the AD Domain of the target endpoint is unavailable, a deployer from each domain may be selected, with priority for deployers that are connected to the same sub-network as the target endpoint. In some embodiments, neighboring deployers, which are deployers that are connected to the same subnetwork as the targeted endpoint are more likely to communicate in a reliable manner with the target endpoint and may be given deployment priority.

In some embodiments, upon deployer selection, the selected deployer may receive a command to fetch the package file from a central server to be deployed to the target endpoint, and the required configuration set by the user or automatically generated by the system. In some embodiments, a user selects the package to deploy in the main application and the command including this package is sent to all the deployers. In some embodiments, the deployer module may be packaged as an extension that agents are configured to download from a cloud database or other resource when needed.

In some embodiments, the deploy command may also include instructions regarding the specific set of deploying capabilities that are required to perform the deployment on the target endpoint. For example, the use of SSH may be unneeded in some embodiments. If the agent has not downloaded and installed the necessary deployer module, or has a previous version that requires upgrading, a download/upgrade of a new deployer module may occur. In some embodiments, this method may preserve resources, such as bandwidth and disk space, on the deployer's endpoint. In some embodiments, following the deployment, the deployer module may be unloaded, freeing RAM and CPU resources to a pre-deployment level. In some embodiments, this mechanism may be highly efficient in cases where there is a large fleet of agents installed on a plurality of endpoints, in which some agents execute a deploy command at a fraction of their lifetime. In some embodiments, the deploy command may also provide instructions to the deployer regarding the package file that should be deployed to the target endpoint. In some embodiments, if the agent does not have access to the relevant package on disk, a download of the package may occur.

In some embodiments, a deployer equipped with a package file and deployment configuration may be configured to receive credentials via deployment protocol. A crucial part in any deployment protocol is obtaining and distributing credentials necessary for deployment. Some embodiments herein utilize the concept of "Credentials Groups" to facilitate secure and proper distribution of credentials.

In some embodiments, the user, via a dynamic user interface, may divide the credentials into one or more credentials groups, such that each group may have the credentials for different domains, or different operating systems. In essence, this configuration ensures that access to deploy one set of credentials does not automatically enable access to deploy using all other credentials. As noted above, this can be critical for large organizations that may restrict administrative privileges to specific users but enable users to deploy that have permissions to deploy in specific sites.

In some embodiments, this can be enabled by selection of a separate "group passphrase" for each credentials group. In some embodiments, different credentials groups may have different "group passphrases", and therefore only users who have access to the group passphrase may deploy using the credentials within those groups. In some embodiments, users may select credentials groups prior to deploying and provide the appropriate group passphrases to proceed with deployment using the selected credentials groups.

In some embodiments, when specific credentials groups are selected and properly authenticated, the deployers may use some or all of the relevant credentials from the selected credentials until one of the credentials groups provides proper authentication to the target endpoint.

In some embodiments, the deployment protocol may comprise one or more of the following steps: credentials group creation; adding credentials to a credentials group; deployer public key registration; and securely sending the credentials to the deployer. In some embodiments, removing credentials or changing group passphrases is enabled. It should also be noted that the above-mentioned steps of the deployment protocol are not necessarily limited to the order recited and do not necessarily occur sequentially in any specific time period.

In some embodiments, in the group creation phase, a credentials group name may be chosen or automatically generated for a credentials group. In some embodiments, when targeting Windows-based target endpoints, a unique domain for the credentials group may also be selected. In some embodiments, a group passphrase may be selected by a user. In some embodiments, the group passphrase may guard the credentials from the security vendor, from unauthorized users, and others. In some embodiments, only users who have access to the group passphrase will be able to deploy using the corresponding credentials group.

In some embodiments, although the group passphrase may never be transmitted online in plaintext (although it may be transmitted in an encrypted form), it may be necessary to validate the group passphrase. Thus, in some embodiments, an encrypted nonce, which may comprise a sequence of random bytes, may be encrypted by a key derived from the group passphrase. In some embodiments, the encryption may be completed using a key derivation function (KDF) such as PBKDF1, PBKDF2 or similar functions. In some embodiments, the encrypted nonce may be stored by the security vendor and could be retrieved using the credentials group name or other identifying information. A flowchart of the group creation process according to some embodiments is illustrated in FIG. 1.

Figure 2:
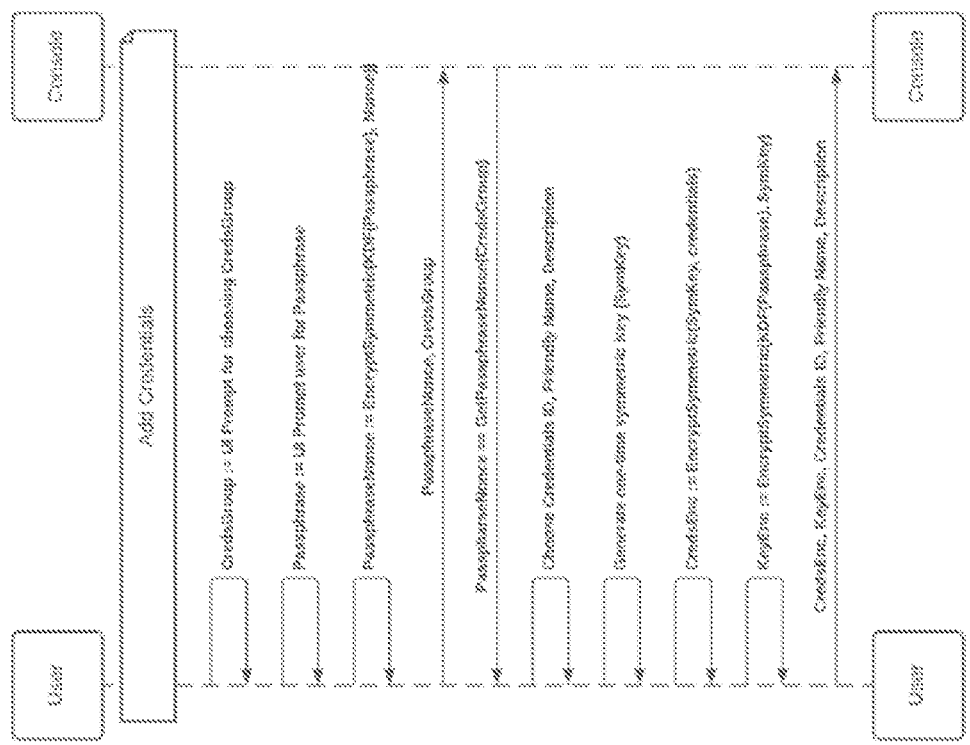
FIG. 2 illustrates a flowchart of an example process for adding credentials to an existing credential group according to some embodiments.

In some embodiments, a credentials group is selected by a user or automatically selected by the system, and the relevant group passphrase is validated using the encrypted nonce sent from the security vendor server. In some embodiments, a user may add new credentials to the credentials group after creation. FIG. 2 illustrates a flowchart of an example process for adding credentials to an existing credentials group. In some embodiments, to add credentials to a credentials group, a user may select a credentials type, such as but not limited to "User+Password" or "Certificate File." In some embodiments, those credentials are encoded, and a cryptographically secure pseudo-random symmetric encrypted key SymKey is generated. In some embodiments, the encoded credentials may be encrypted using the SymKey (into CredsEnc). In some embodiments, the encryption key may also be encrypted using a different key derived from the group passphrase using a key derivation function (KDF) (into KeyEnc).

In some embodiments, credential metadata, such as a credentials name and identification, and also the CredsEnc and the KeyEnc may be sent to a security vendor cloud database. It is noted that in some embodiments, without the selected group passphrase, the KeyEnc cannot be decrypted to SymKey, and without the decrypted SymKey, CredsEnc cannot be decrypted to the encoded credentials. Therefore, without the group passphrase, the plain credentials are not accessible to the security vendor even with access to the metadata, CredsEnc, and KeyEnc.

Figure 3:
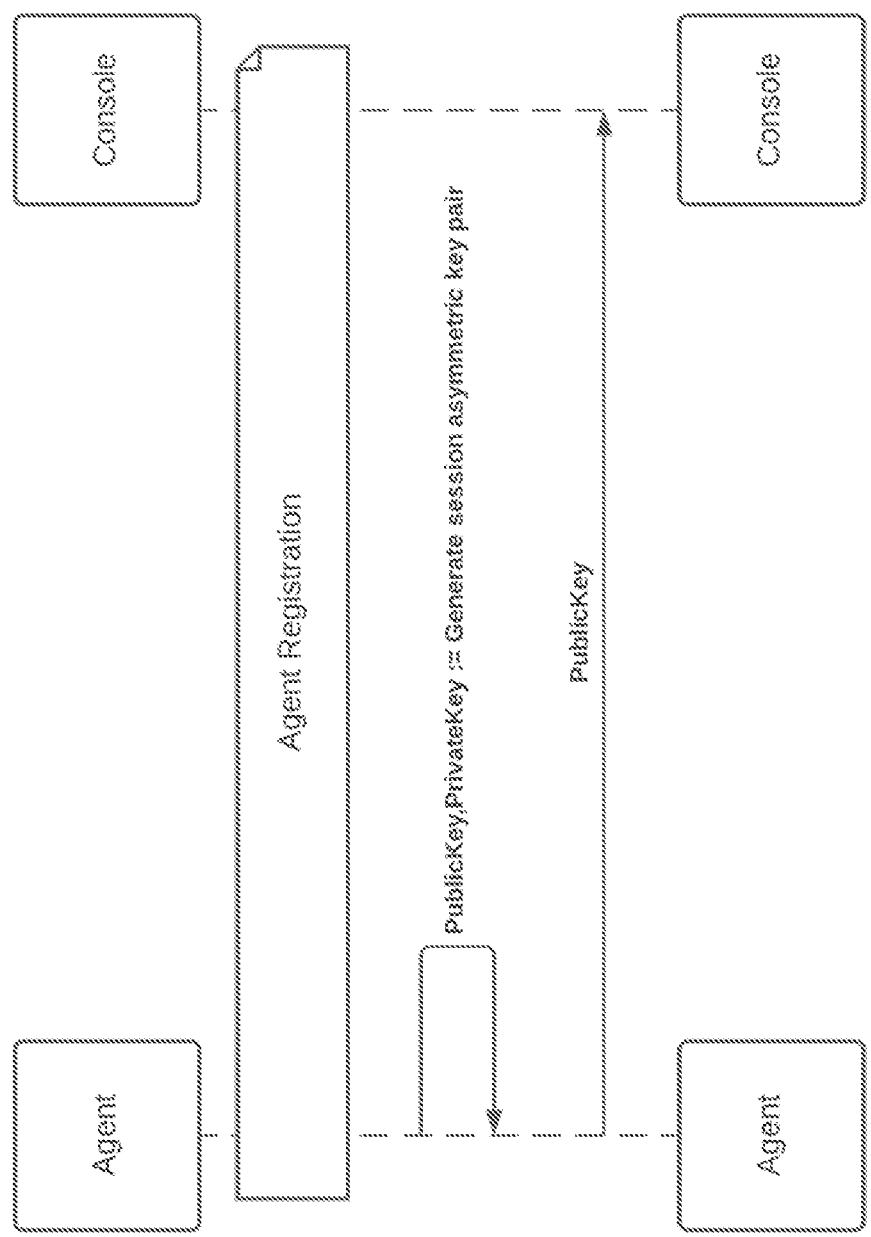
FIG. 3 illustrates an example flowchart of an agent registration process according to some embodiments herein.

In some embodiments, another step in the deployment protocol may comprise a deployer public key registration. In some embodiments, whenever an agent registers to the security vendor management console, the agent may generate a temporary asymmetric Private and Public key pair and send the public key to the security vendor management console. In some embodiments, the registration process enables the selected credentials to be encrypted in a way that only the selected deployer can decrypt. In some embodiments, the security vendor management console may store some or all of the agents' Public keys with their agent identification data, such that if a user requests the Public key of a specific agent, it can be easily retrieved. FIG. 3 illustrates an example flowchart of an agent registration process according to some embodiments herein.

In some embodiments, upon selection of the credentials group for deployment, the selected credentials may be provided to the deployer. In some embodiments, the provision of credentials to the deployer may involve a first interaction between a user and the security vendor console, and a second interaction between the console and the deployer(s).

Figure 4:
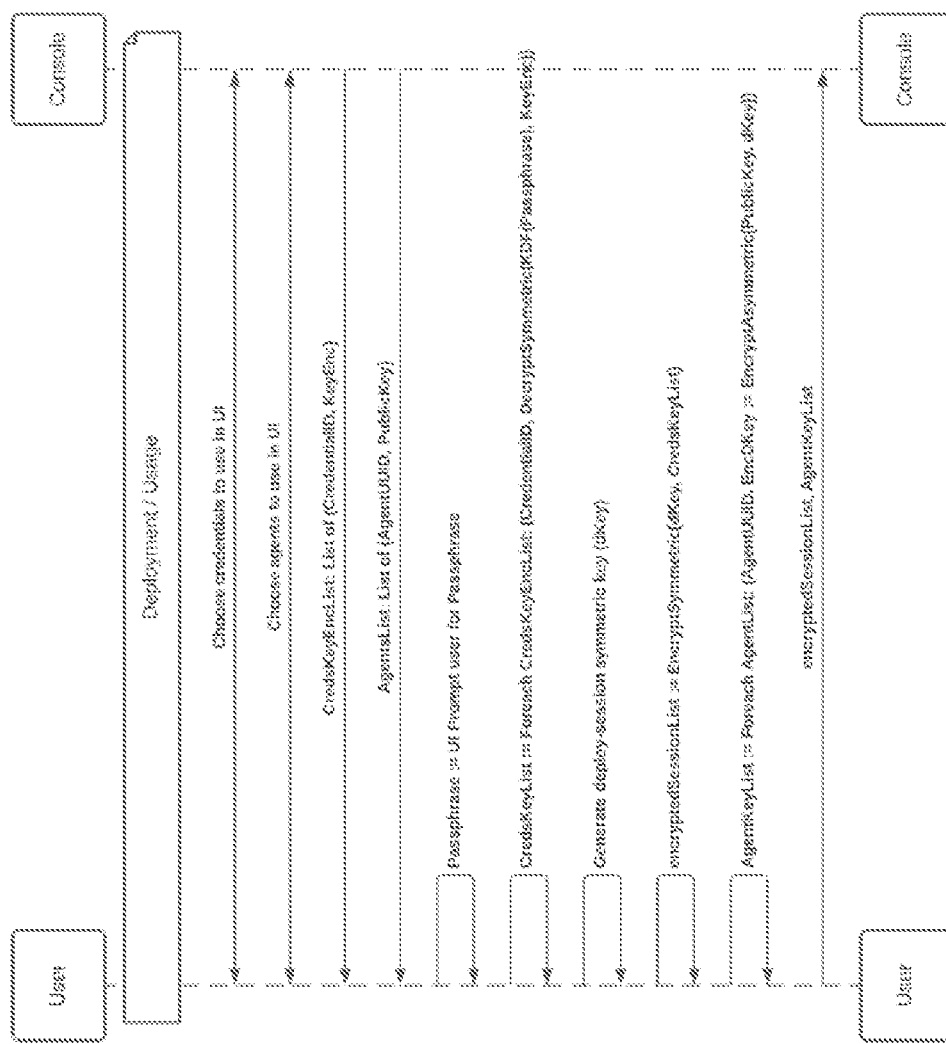
FIG. 4 illustrates an example flowchart of an interaction between a user and security vendor console for deployment of credentials to deployers according to some embodiments herein.

FIG. 4 illustrates an example flowchart of an interaction between a user and security vendor console for deployment of credentials to deployers according to some embodiments herein. In some embodiments, in the first interaction, the user may select the deployers or the deployers may be automatically selected by the system.

In some embodiments, the first interaction may also comprise selection of the credentials groups by the user or the system. In some embodiments, during the deployment process, the user may be requested to select one or more credentials groups to engage in the deployment. In some embodiments, selection of more credentials groups may slow the process and may increase the deployment fail rate in cases in which the target endpoint domain is Windows and the AD Domain is not known to the system. In some embodiments, in case one or more target endpoints are Windows devices that are associated to a specific domain, the system may mark "matched" on credentials group(s) with a matching associated AD Domain. In some embodiments, in case one or more target endpoints are Linux or Mac, the system may mark "matched" on the matching credentials group(s). In some embodiments, in case there exists at least one target endpoint that is a Windows device without an associated AD Domain, credentials groups (that are not marked as "required") that are associated to the same subnetwork of the target endpoint may be marked as "suggested". In some embodiments, if there are no deployers on the same subnetwork as the target endpoint, all remaining credentials groups (that are not marked as "required") will be marked as "suggested". In some embodiments, there may be no applicable deployers associated with the selected credentials group. In such embodiments, the system may mark that credentials group as "not applicable." In some embodiments, a credentials group having no existing applicable deployers may be labeled as "no online deployers" and may be blocked from selection and activation. In some embodiments, the system may automatically select appropriate credentials groups according to the characteristics of the deployers, target endpoint, and software applications to be deployed.

In some embodiments, upon selection of the credentials groups, a list of the encrypted SymKeys of the relevant credentials and a list of the Public keys of the selected deployers is provided to the user machine. In some embodiments, the user may input group passphrases to decrypt the EncKeys, and to generate a new pseudo-random symmetric key dKey. In some embodiments, dKey may be used to symmetrically encrypt the decrypted list of SymKeys (with their relevant credential identifications). In some embodiments, the user machine may use the selected deployers' Public keys to encrypt the dKey and can transmit to the security vendor management console an AgentKeyList (a list of the asymmetrically encrypted dKey using all of the agents' public keys) and an encryptedSessionList (the encrypted list of SymKeys).

Figure 5:
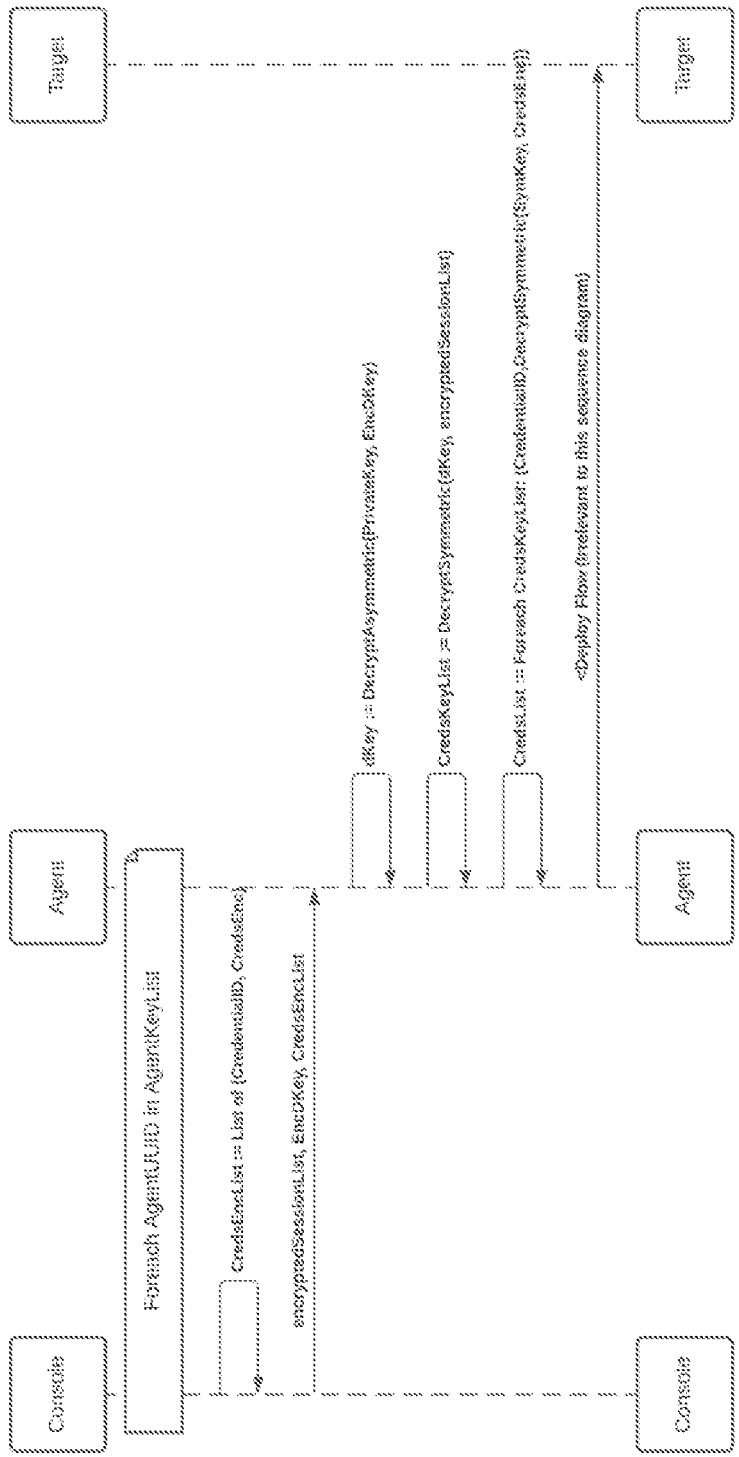
FIG. 5 illustrates an example flowchart of an interaction between a security vendor console and deployers according to some embodiments herein.

FIG. 5 illustrates an example flowchart of an interaction between a security vendor console and deployers according to some embodiments herein. In some embodiments, in the second interaction, the security vendor management console may transmit, to each deployer, the asymmetrically encrypted dKey (EncDKey), the encryptedSessionList, and the list of CredsEnc of the relevant credentials. In some embodiments, the deployer may decrypt the EncDKey using its Private key, which is only known to the deployer. In some embodiments, the decrypted dKey can decrypt the encryptedSessionList and get the list of SymKeys. In some embodiments, the list of SymKeys can be used by the deployer to decrypt the credentials in CredsEncList. As such, the relevant credentials can be used to access and deploy to the appropriate target endpoint.

It is noted that in some embodiments, without the deployer Private key, the security vendor management console cannot decrypt the EncryptedDKey, and therefore cannot decrypt the encryptedSessionList. As a result, the security vendor management console cannot access the encrypted credentials.

Moreover, in some embodiments, the user does not receive the encrypted credentials after their creation, such that although the user has the group passphrase, and has SymKeys, the user cannot access the decrypted credentials. As such, the credentials are protected from unauthorized users and their browsers.

In some embodiments, once the credentials safely arrive to the deploying agent, the deployment process may commence. In some embodiments, to guard the credentials from malicious processes in the deployer's machine, the credentials may never be saved to the disk, and the process that handles the credentials may be shielded with various anti-tampering measures. In some embodiments, with access to the credentials, the selected deployer is capable of initiating the deployment process. The deployer may be provided with the target endpoint and its IP address and is capable of communicating with the target endpoint via the deployment module.

In some embodiments, the deployer may select an appropriate communication protocol based on the target endpoint, such as WinRM for Windows machines and SSH for Mac and Linux targets. WinRM allows systems to access or exchange management information across a common network. Utilizing scripting objects or the built-in command-line tool, WinRM can be used with any remote computers that may have baseboard management controllers (BMCs) to acquire data. Windows-based computers including WinRM contain data supplied by Windows Management Instrumentation (WMI) that can also be obtained. WinRM is widely used across modern Windows machines, and provides the ability to authenticate securely, copy the desired package from the deployer to the target machine, and run the required scripts. In some embodiments, WinRM may be utilized as a default deployment protocol. In some embodiments, if WinRM fails, WMI may be used as a fallback. In some embodiments, a user may need to allow new technology local area network manager NTLM in order to utilize WMI.

In some embodiments, if NTLM is utilized during deployment, PSRemoting may need to be enabled on endpoint devices on which deployers are installed. In some embodiments, deployers may be configured to enable PSRemoting on the endpoint before starting the deployment. In some embodiments, users may be able to enable PSRemoting via the dynamic user interface. In some embodiments, upon completion of the deployment, PSRemoting may be disabled automatically by the deployer until another deployment is initiated.

In some embodiments, once the deployer has initiated a connection with the target machine, the deployer may use the encrypted credentials in order to authenticate. Following a successful connection, the deployer may copy the package file to the target machine. In some embodiments, the deployer may unpack the package file, execute the file, and use the deployment parameters to configure the installation of software as required. In some embodiments, the deployer may retrieve logs from the target, and transmit those logs to the management console for a later analysis by the user. Throughout the installation process, the deployer may communicate with the management console regarding the progress, deployment success, or failure events.

In some embodiments, the deployment may comprise security modification auditing for devices on which deployers are installed. For example, in some embodiments, all configurations that were modified during a deployment flow by the deployer, e.g., PSRemote activation or TrustedHosts modification, are automatically reverted once the deployment is complete. In case of a sudden reboot during the deployment or in the event of a device failure or error, there may be leftover modifications that should have been reverted but were not successfully reverted. Such configuration modifications may be reported to users as notifications, such that the modifications can be tracked and monitored by the users.

Figure 6:
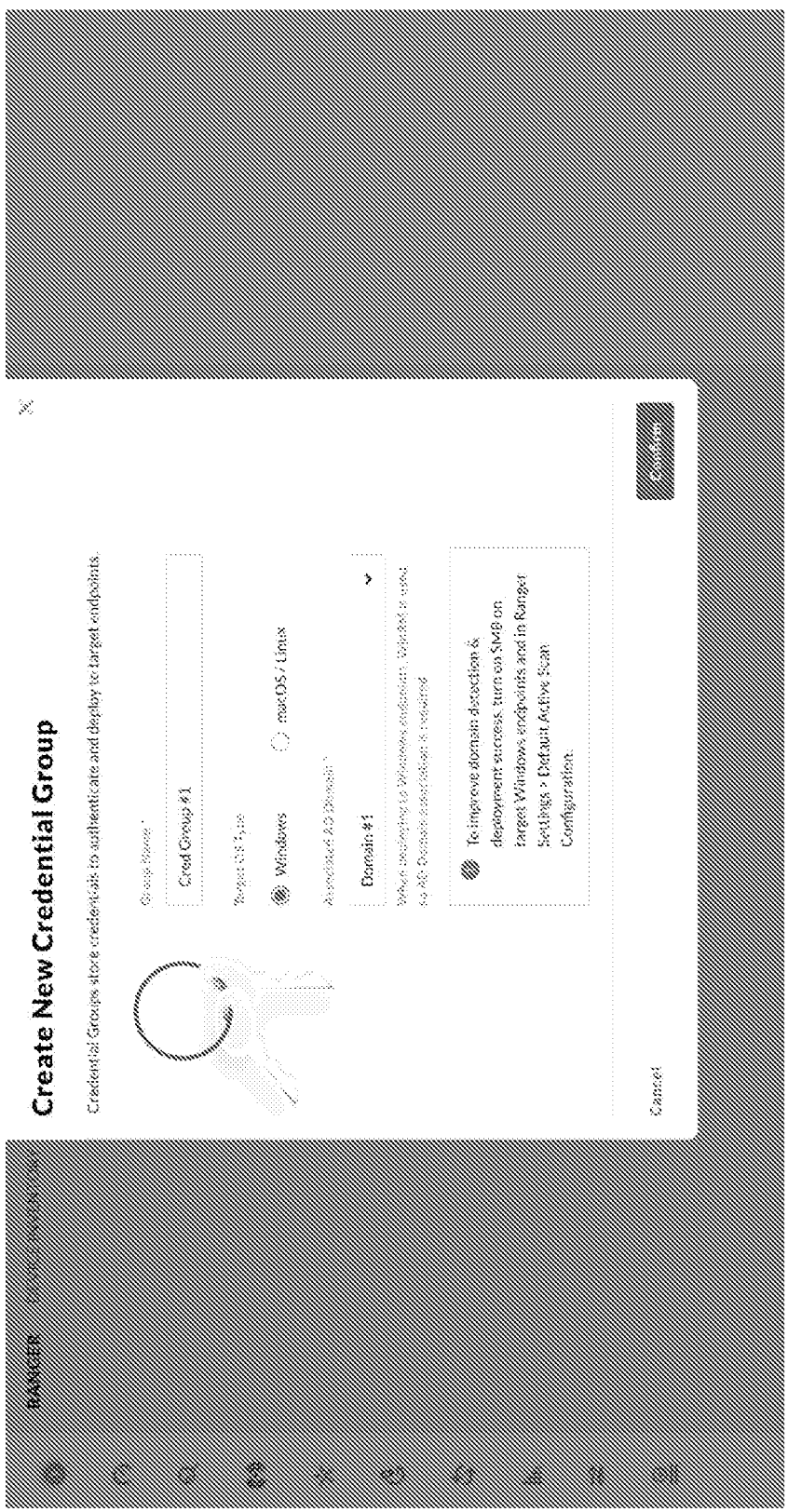

FIGS. 6-13 illustrate example configurations of a dynamic user interface for deploying software according to some embodiments herein. FIG. 6 illustrates an example user interface for creating a new credentials group corresponding to a specific operating system and/or AD domain. In some embodiments, users may input a specified group name for the newly created credentials group.

Figure 7:
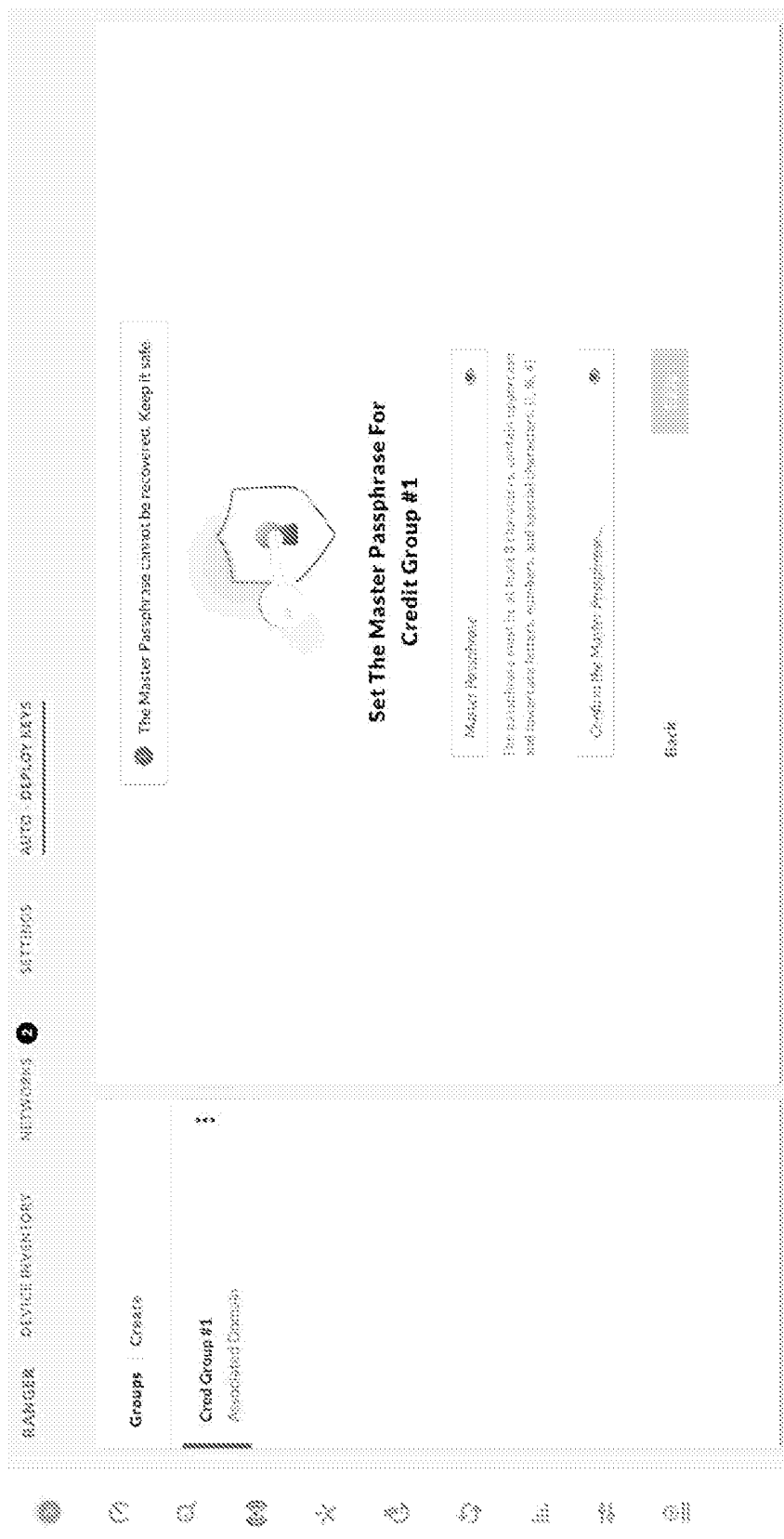

FIG. 7 illustrates an example user interface for creating a group passphrase for a newly created credentials group. In some embodiments, the group passphrase may be utilized by a user to deploy to a target endpoint using the corresponding credentials group.

Figure 8:
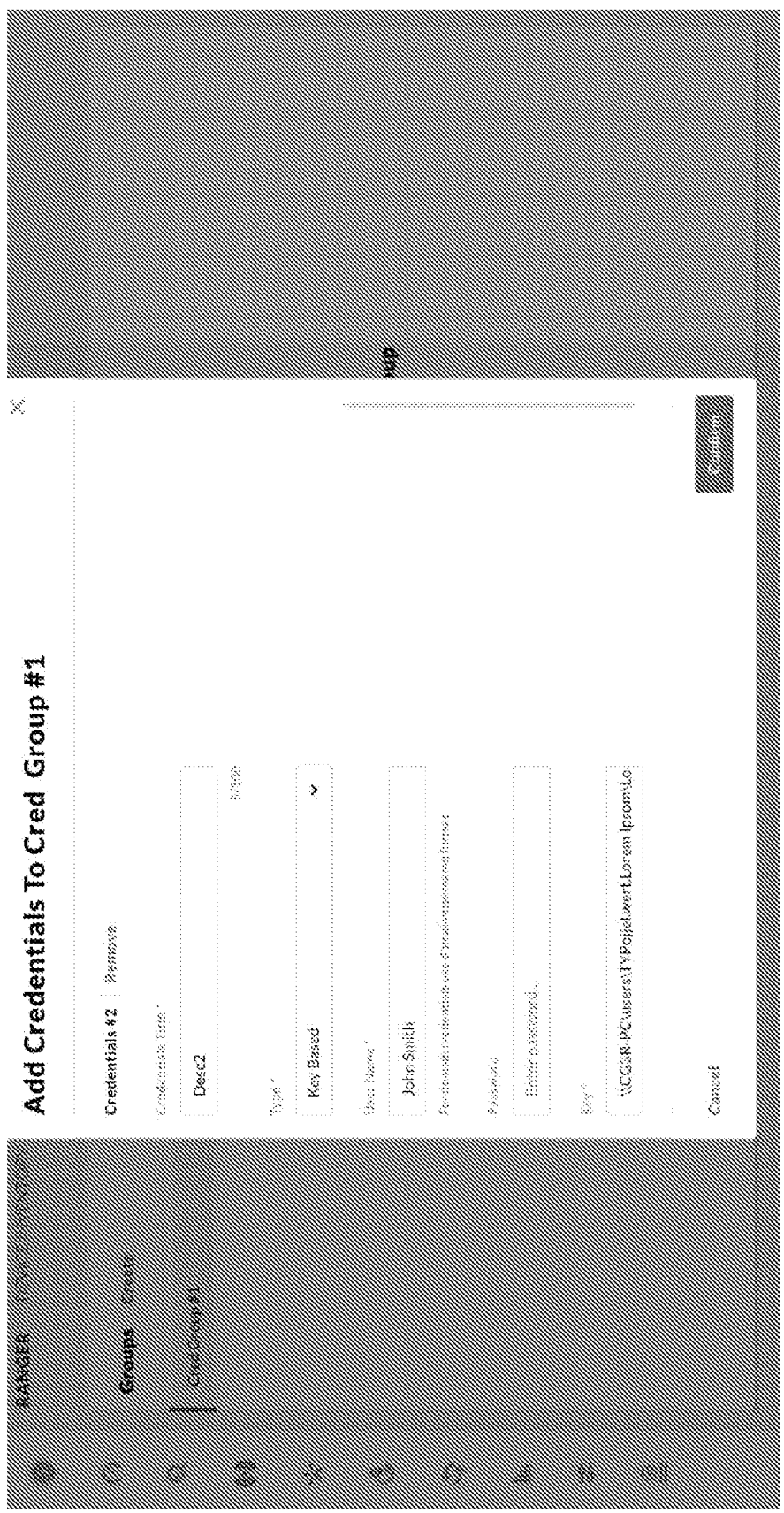

FIG. 8 illustrates an example user interface for adding credentials to a created credentials group. In some embodiments, a user may specify a title, type, and key for each set of credentials to be added to a credentials group.

Figure 9:
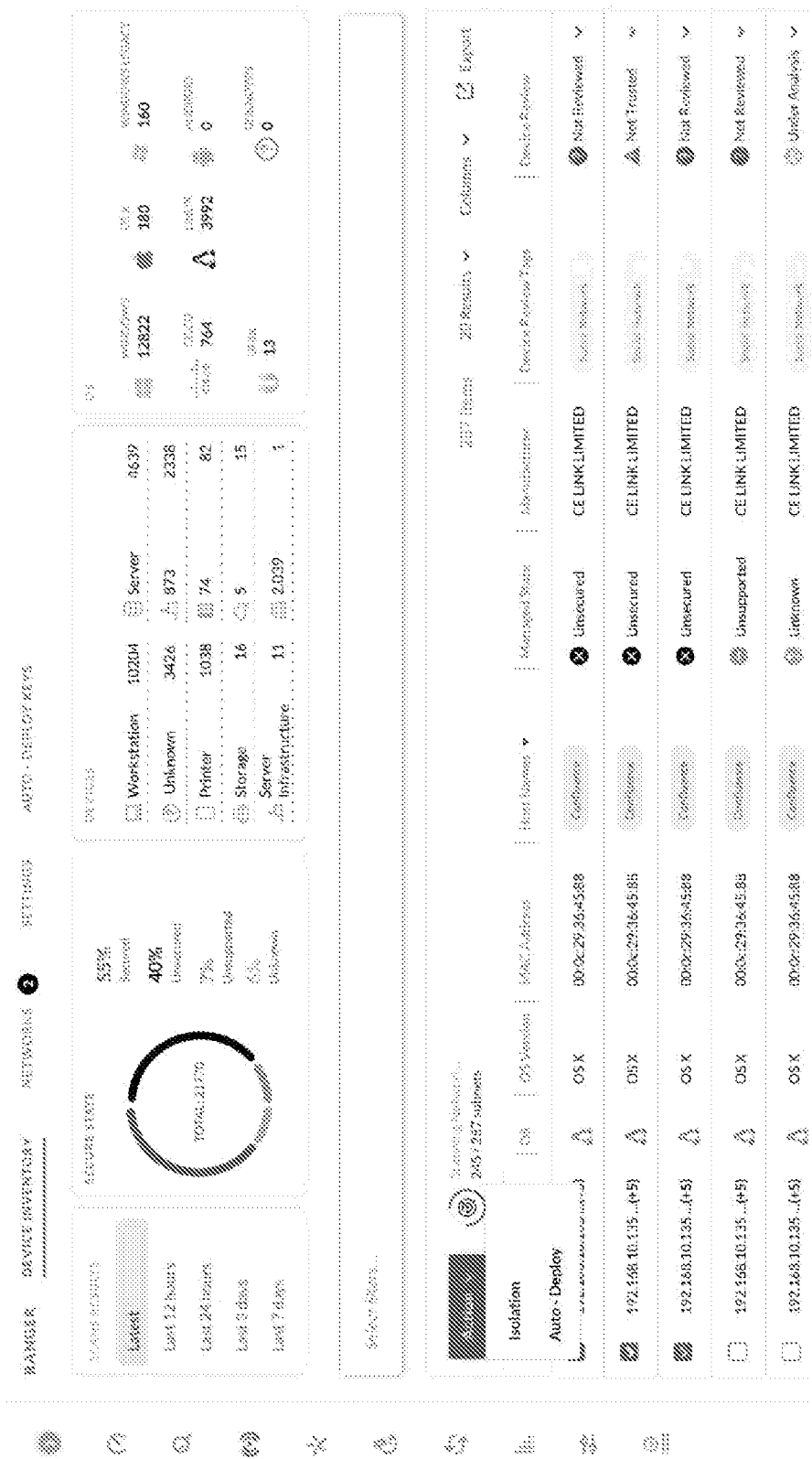

FIG. 9 illustrates an example user interface for selecting target endpoints according to some embodiments herein. In some embodiments, the interface may comprise network and security statistics, as well as a list of unmanaged endpoints. In some embodiments, the unmanaged endpoints may be further divided into one or more categories, such as "unsecured", which may represent endpoints for which a security agent may be compatible, or "unsupported", which may represent endpoints on which a security agent would not be compatible.

Figure 10:
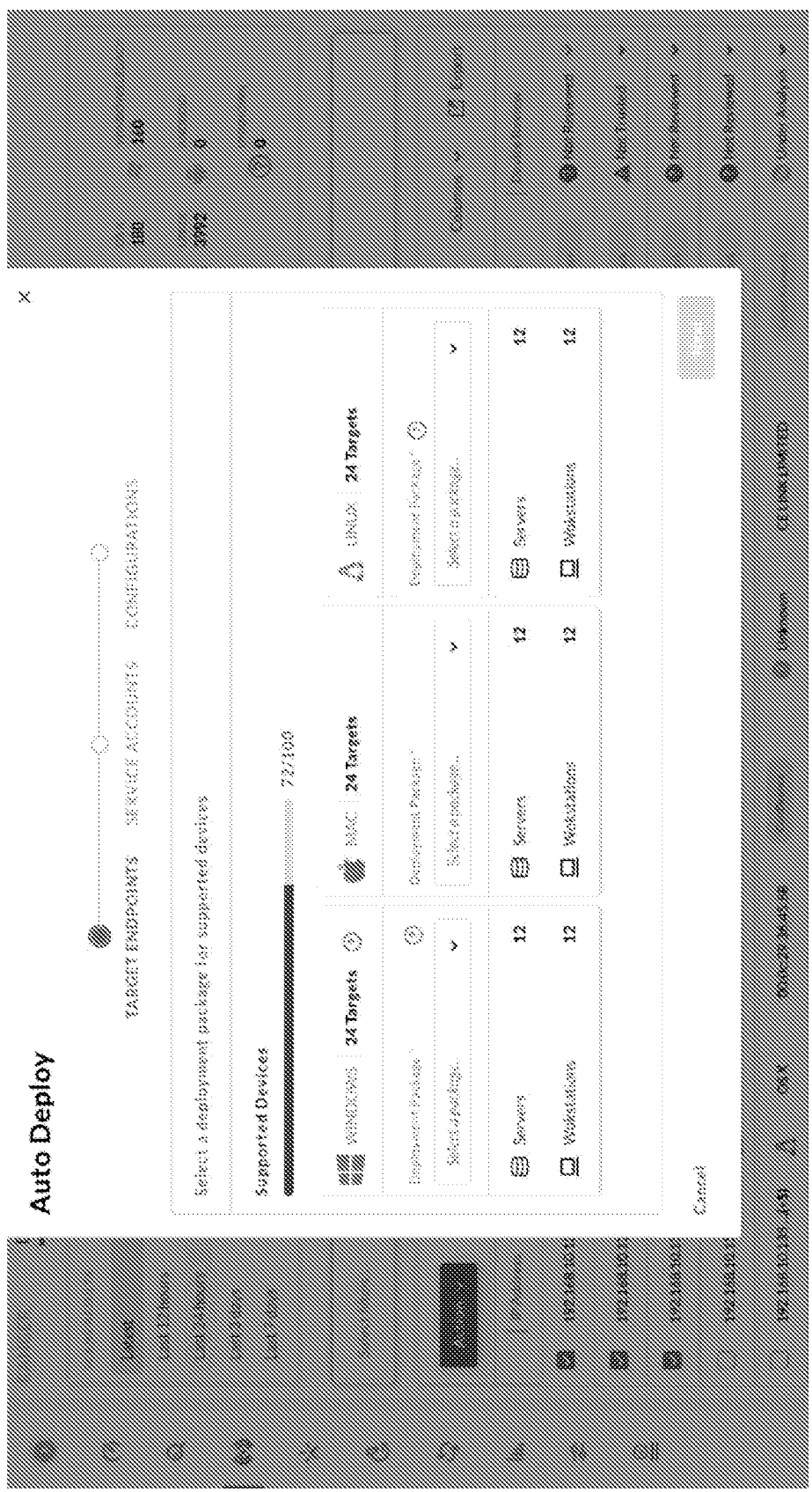

FIG. 10 illustrates an example user interface for file package selection according to some embodiments herein. In some embodiments, the file packages may be divided by operating system type and/or operating system version.

Figure 11:
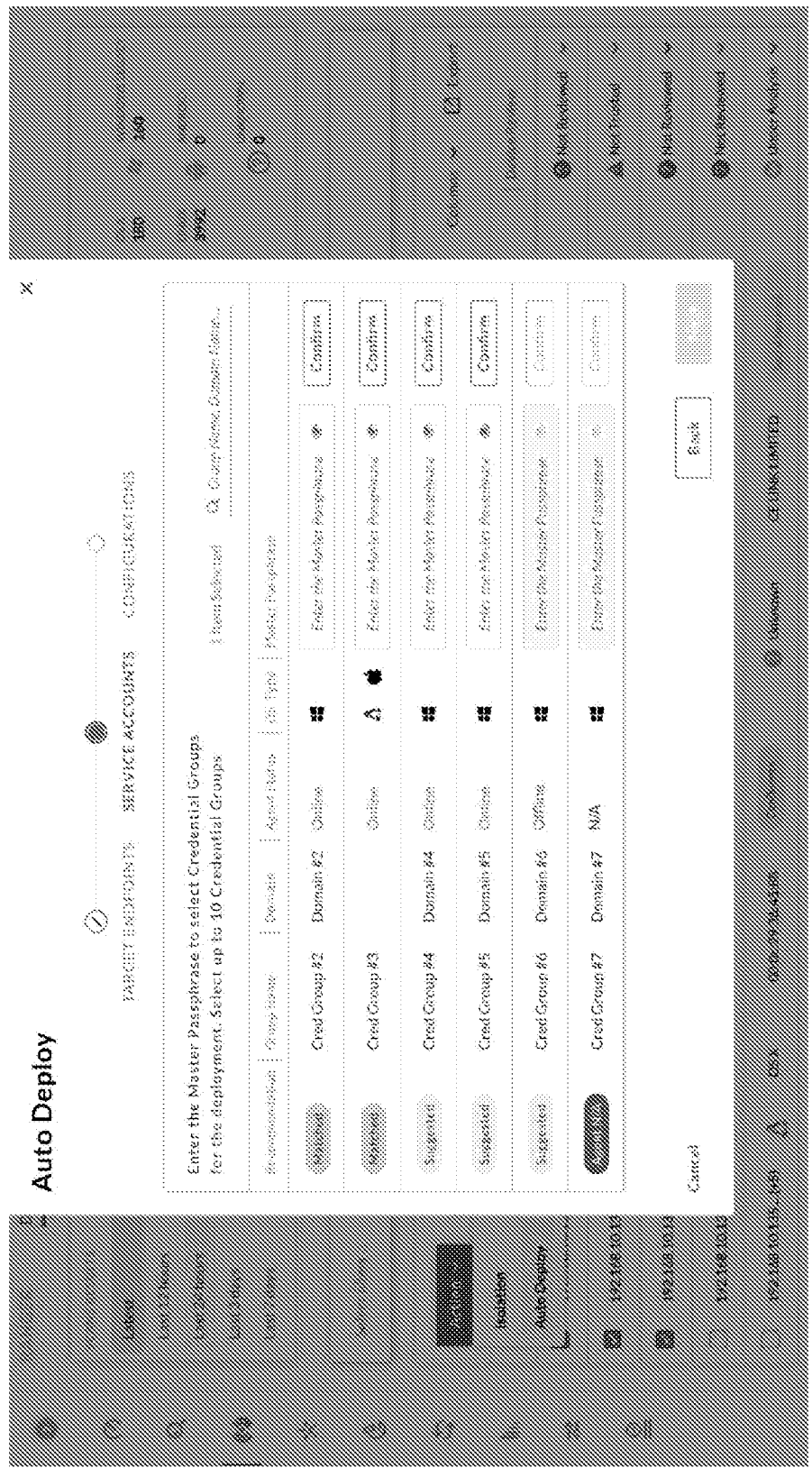

FIG. 11 illustrates an example user interface for selecting credentials for deployment of software to one or more target endpoints. In some embodiments, selection of credentials may require input of the group passphrase for the corresponding credentials group.

Figure 12:
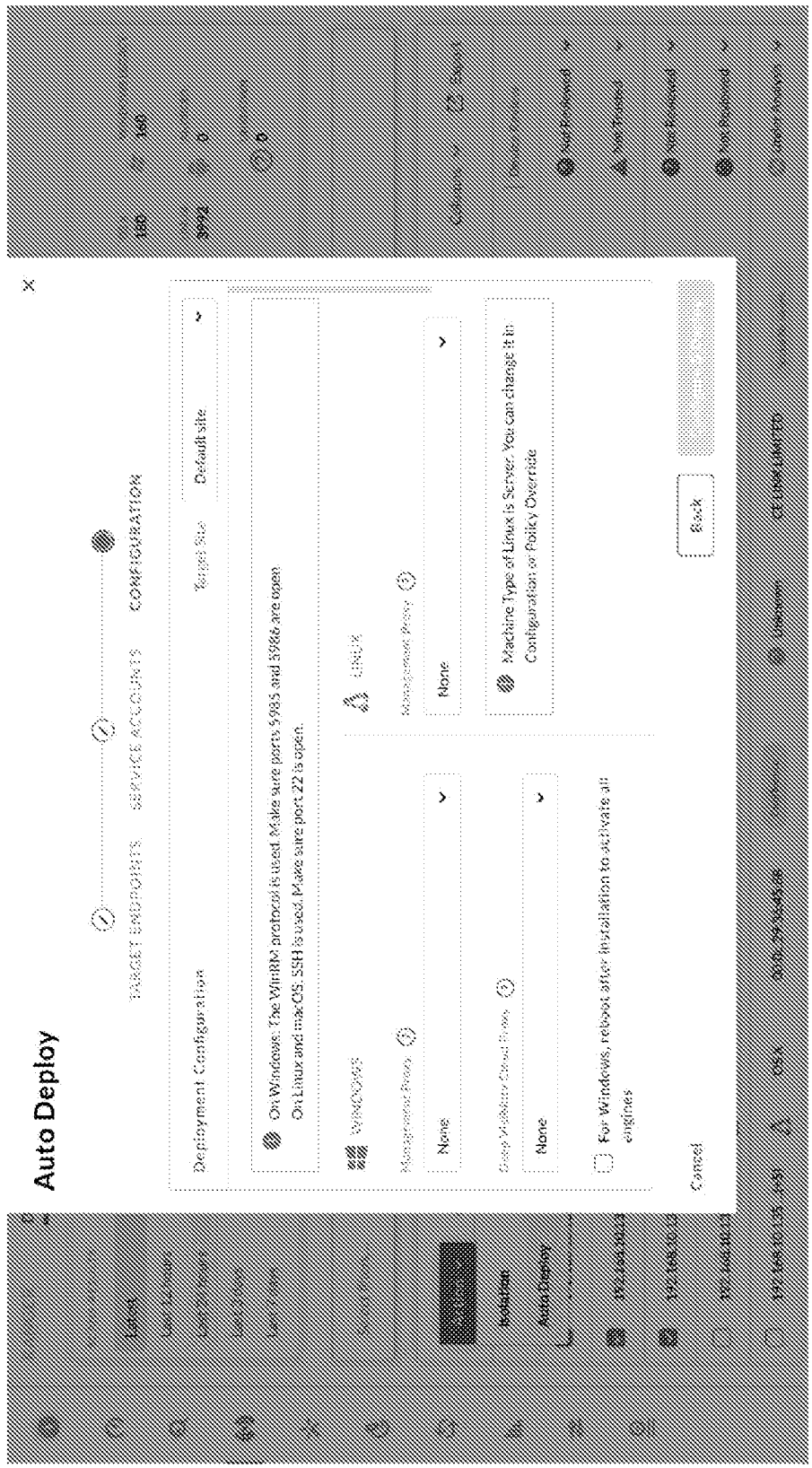

FIG. 12 illustrates an example user interface for configuration of a deployment. In some embodiments, user may control proxies, destination sites, reboot parameters, and other configuration parameters for the deployment.

FIG. 13 illustrates an example user interface for tracking the progress of an ongoing deployment to one or more target endpoints. In some embodiments, users may track the status of deployments via the user interface and/or take corrective actions according to mechanisms of the user interface.

Computer System

Figure 14:
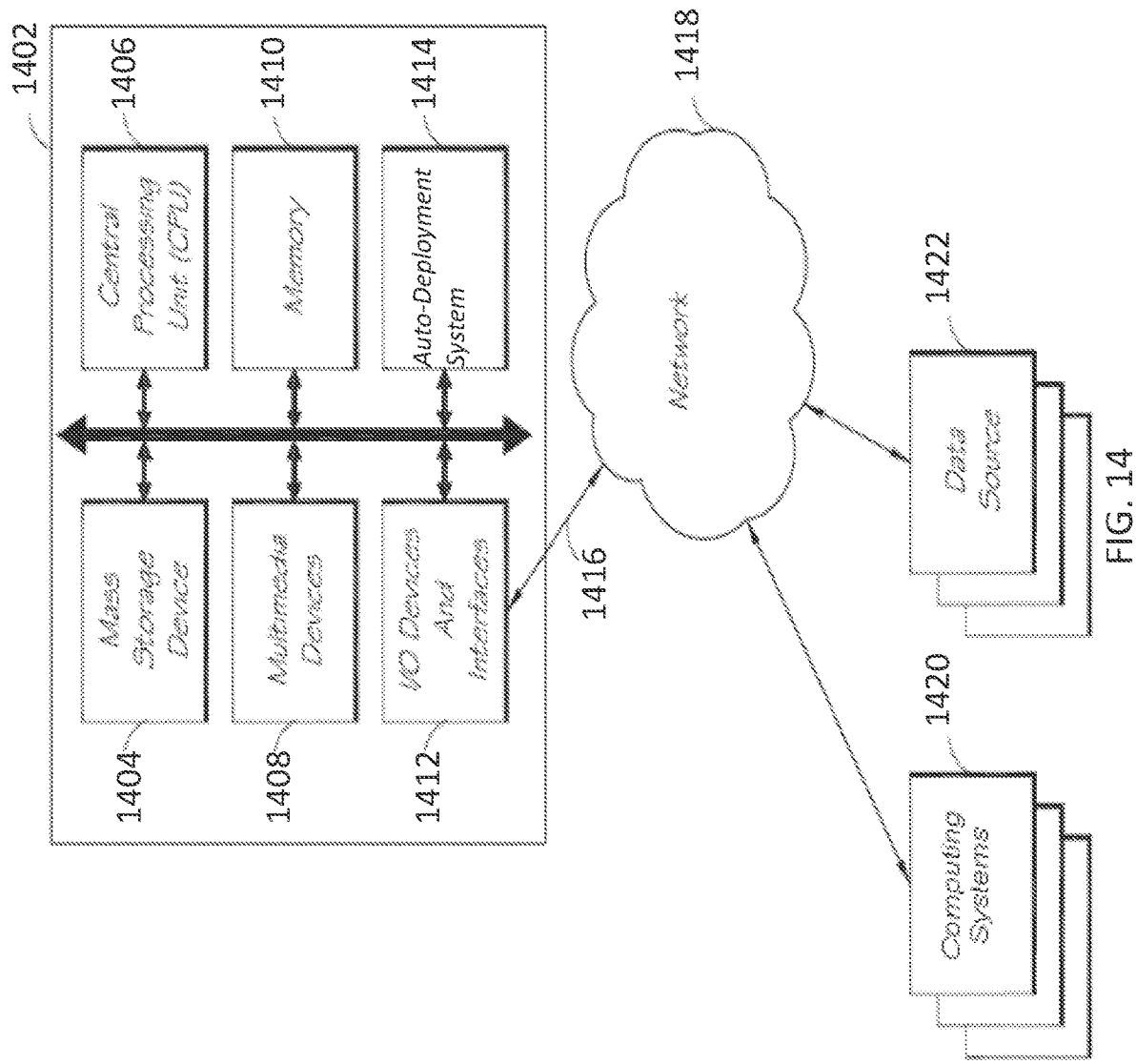
FIG. 14 is a block diagram depicting an embodiment of a computer hardware system configured to run software for implementing one or more embodiments of an automatic deployment system.

In some embodiments, the systems, processes, and methods described herein are implemented using a computing system, such as the one illustrated in FIG. 14. The example computer system 1402 is in communication with one or more computing systems 1420 and/or one or more data sources 1422 via one or more networks 1418. While FIG. 14 illustrates an embodiment of a computing system 1402, it is recognized that the functionality provided for in the components and systems of computer system 1402 can be combined into fewer components and systems, or further separated into additional components and systems.

Computing System Components

The computer system 1402 can comprise an automatic deployment system 1414 that carries out the functions, methods, acts, and/or processes described herein. The computer system 1402 can comprise an automatic deployment system 1414 executed on the computer system 1402 by a central processing unit 1406 discussed further below.

In general the word "system," as used herein, refers to logic embodied in hardware or firmware or to a collection of software instructions, having entry and exit points. Systems are written in a program language, such as JAVA, C, or C++, or the like. Software systems can be compiled or linked into an executable program, installed in a dynamic link library, or can be written in an interpreted language such as BASIC, PERL, LUA, PHP or Python and any such languages. Software systems can be called from other systems or from themselves, and/or can be invoked in response to detected events or interrupts. Systems implemented in hardware include connected logic units such as gates and flip-flops, and/or can comprise programmable units, such as programmable gate arrays or processors.

Generally, the systems described herein refer to logical systems that can be combined with other systems or divided into sub-systems despite their physical organization or storage. The systems are executed by one or more computing systems and can be stored on or within any suitable computer readable medium or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

The computer system 1402 includes one or more processing units (CPU) 1406, which can comprise a microprocessor. The computer system 1402 further includes a physical memory 1410, such as random-access memory (RAM) for temporary storage of information, a read only memory (ROM) for permanent storage of information, and a mass storage device 1404, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 1402 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1402 includes one or more input/output (I/O) devices and interfaces 1412, such as a keyboard, mouse, touch pad, and printer. The I/O devices and interfaces 1412 can comprise one or more display devices, such as a monitor, that allows the visual presentation of data to a user. More particularly, a display device provides for the presentation of GUIs as application software data, and multi-media presentations, for example. The I/O devices and interfaces 1412 can also provide a communications interface to various external devices. The computer system 1402 can comprise one or more multi-media devices 1408, such as speakers, video cards, graphics accelerators, and microphones, for example.

Computing System Device/Operating System

FIG. 14 is a block diagram depicting an embodiment of a computer hardware system configured to run software for implementing one or more embodiments of a feature extraction system.

The computer system 1402 can run on a variety of computing devices, such as a server, a Windows server, a Structure Query Language server, a Unix Server, a personal computer, a laptop computer, and so forth. In other embodiments, the computer system 1402 can run on a cluster computer system, a mainframe computer system and/or other computing system suitable for controlling and/or communicating with large databases, performing high volume transaction processing, and generating reports from large databases. The computing system 1402 is generally controlled and coordinated by operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 1402 illustrated in FIG. 14 is coupled to a network 1418, such as a LAN, WAN, or the Internet via a communication link 1416 (wired, wireless, or a combination thereof). Network 1418 communicates with various computing devices and/or other electronic devices. Network 1418 is communicating with one or more computing systems 1420 and one or more data sources 1422. The computer system 1402 can comprise an automatic deployment system 1414 can access or can be accessed by computing systems 1420 and/or data sources 1422 through a web-enabled user access point. Connections can be a direct physical connection, a virtual connection, and other connection type. The web-enabled user access point can comprise a browser system that uses text, graphics, audio, video, and other media to present data and to allow interaction with data via the network 1418.

The output system can be implemented as a combination of an all-points addressable display such as a cathode ray tube (CRT), a liquid crystal display (LCD), a plasma display, or other types and/or combinations of displays. The output system can be implemented to communicate with input devices and/or interfaces 1412 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output system can communicate with a set of input and output devices to receive signals from the user.

Other Systems

The computing system 1402 can comprise one or more internal and/or external data sources (for example, data sources 1422). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1402 can also access one or more data sources 1422. The data sources 1422 can be stored in a database or data repository. The computer system 1402 can access the one or more data sources 1422 through a network 1418 or can directly access the database or data repository through I/O devices and interfaces 1412. The data repository storing the one or more data sources 1422 can reside within the computer system 1402.

URLs and Cookies

In some embodiments, one or more features of the systems, methods, and devices described herein can utilize a URL and/or cookies, for example for storing and/or transmitting data or user information. A Uniform Resource Locator (URL) can comprise a web address and/or a reference to a web resource that is stored on a database and/or a server. The URL can specify the location of the resource on a computer and/or a computer network. The URL can comprise a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can comprise a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can comprise data sent from a website and/or stored on a user's computer. This data can be stored by a user's web browser while the user is browsing. The cookies can comprise useful information for websites to remember prior browsing information, such as a shopping cart on an online store, clicking of buttons, login information, and/or records of web pages or network resources visited in the past. Cookies can also comprise information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

ADDITIONAL EMBODIMENTS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A system for device fingerprinting, the system comprising:
   one or more computer readable storage devices configured to store a plurality of computer executable instructions; and
   one or more hardware computer processors in communication with the one or more computer readable storage devices and configured to execute the plurality of computer executable instructions in order to cause the system to:
      collect, by one or more distributed software agents on one or more endpoint devices of a computer network, endpoint device data;
      transmit, from the one or more distributed software agents on the one or more endpoint devices, the endpoint device data to a central server;
      analyze, by the one or more distributed software agents or the central server, the endpoint device data to determine at least one of an operating system family, an operating system type, and an endpoint device role of at least one of the one or more endpoint devices, wherein analyzing the endpoint device data comprises:
         inputting the endpoint device data into a hierarchical machine learning model comprising:
            a first layer, the first layer configured to classify each of the one or more endpoint devices into an operating system family classification;
            a second layer, the second layer configured to classify each of the one or more endpoint devices of a classified operating system family into an operating system type classification; and
            a third layer, the third layer configured to classify each of the one or more endpoint devices of a classified operating system type into a device role classification,
         wherein each layer of the hierarchical machine learning model comprises:
            one or more machine learning sub-models, each sub-model configured to generate a classification of each of the one or more endpoint devices based on a subset of the endpoint device data; and
            a neural network, the neural network configured to utilize the classifications generated by each of the one or more sub-models to generate a layer classification of each of the one or more endpoint devices, the layer classification comprising the operating system family classification for the first layer, the operating system type classification for the second layer, and the device role classification for the third layer; and
         aggregate, by the one or more distributed software agents or the central server, the operating system family classification, the operating system type classification, and the device role classification for each of the one or more endpoint devices to generate a device fingerprint of each of the one or more endpoint devices.

2. The system of claim 1, wherein the endpoint device data comprises both passive broadcast data and active unicast data.

3. The system of claim 2, wherein the passive broadcast data comprises broadcast protocol data including one or more of address resolution protocol (ARP), dynamic host configuration protocol (DHCP), server message block (SMB), simple service discovery protocol (SSDP), multicast domain Name system (mDNS), or simple network management protocol (SNMP).

4. The system of claim 2, wherein the active unicast data comprises data obtained by scanning, by the one or more distributed software agents, open ports including one or more of secure shell (SSH), Telnet, hypertext transfer protocol (HTTP), hypertext transfer protocol secure (HTTPS), and remote desktop protocol (RDP).

5. The system of claim 1, wherein the one or more hardware computer processors are further configured to execute the plurality of computer executable instructions in order to cause the system to apply, by the one or more distributed software agents, one or more security protocols to the one or more endpoint devices based at least in part on the determined operating system family, operating system type, or endpoint device role.

6. The system of claim 1, wherein the one or more hardware computer processors are further configured to execute the plurality of computer executable instructions in order to cause the system to apply, by the one or more distributed software agents or the central server, one or more labels to the endpoint device data based on one or more manual or automatically generated labeling rules prior to analyzing the endpoint device data.

7. The system of claim 1, wherein the one or more distributed software agents continuously collect the endpoint data or the network traffic data from the one or more endpoint devices.

8. The system of claim 1, wherein the one or more hardware computer processors are further configured to execute the plurality of computer executable instructions in order to cause the system to access, by the one or more distributed software agents or the central server, one or more databases to collect additional endpoint device data comprising one or more of device media access control (MAC) addresses, operating system versions, device manufacturers, and granular physical device identifications.

9. The system of claim 1, wherein the one or more machine learning sub-models comprise XGBoost or another decision tree ensemble.

10. The system of claim 1, wherein the neural network of each layer comprises a fully connected neural network.

11. The system of claim 1, wherein an output of the neural network comprises a numerical result indicating the probability of an endpoint device having a specific OS family for the first layer, the probability of an endpoint device having a specific OS type for the second layer, and the probability of an endpoint device having a specific device role for the third layer, and wherein if the probability is above a predetermined threshold, the layer classification is generated.

12. A computer implemented method for device fingerprinting, the method comprising:
  collecting, by one or more distributed software agents on one or more endpoint devices of a computer network, endpoint device data;
  transmitting, from the one or more distributed software agents on the one or more endpoint devices, the endpoint device data to a central server;
  analyzing, by the one or more distributed software agents or the central server, the endpoint device data to determine at least one of an operating system family, an operating system type, and an endpoint device role of at least one of the one or more endpoint devices, wherein analyzing the endpoint device data comprises:
    inputting the endpoint device data into a hierarchical machine learning model comprising:
      a first layer, the first layer configured to classify each of the one or more endpoint devices into an operating system family classification;
      a second layer, the second layer configured to classify each of the one or more endpoint devices of a classified operating system family into an operating system type classification; and
      a third layer, the third layer configured to classify each of the one or more endpoint devices of a classified operating system type into a device role classification,
    wherein each layer of the hierarchical machine learning model comprises:
      one or more machine learning sub-models, each sub-model configured to generate a classification of each of the one or more endpoint devices based on a subset of the endpoint device data; and
      a neural network, the neural network configured to utilize the classifications generated by each of the one or more sub-models to generate a layer classification of each of the one or more endpoint devices, the layer classification comprising the operating system family classification for the first layer, the operating system type classification for the second layer, and the device role classification for the third layer; and
  aggregating the operating system family classification, by the one or more distributed software agents or the central server, the operating system type classification, and the device role classification for each of the one or more endpoint devices to generate a device fingerprint of each of the one or more endpoint devices;
wherein the central server comprises a computer processor and an electronic storage medium.

13. The method of claim 12, wherein the endpoint device data comprises both passive broadcast data and active unicast data.

14. The method of claim 13, wherein the passive broadcast data comprises broadcast protocol data including one or more of address resolution protocol (ARP), dynamic host configuration protocol (DHCP), server message block (SMB), simple service discovery protocol (SSDP), multicast domain Name system (mDNS), or simple network management protocol (SNMP).

15. The method of claim 13, wherein the active unicast data comprises data obtained by scanning, by the one or more distributed software agents, open ports including one or more of secure shell (SSH), Telnet, hypertext transfer protocol (HTTP), hypertext transfer protocol secure (HTTPS), and remote desktop protocol (RDP).

16. The method of claim 12, wherein the one or more hardware computer processors are further configured to execute the plurality of computer executable instructions in order to cause the system to apply, by the one or more distributed software agents, one or more security protocols to the one or more endpoint devices based at least in part on the determined operating system family, operating system type, or endpoint device role.

17. The method of claim 12, wherein the one or more hardware computer processors are further configured to execute the plurality of computer executable instructions in order to cause the system to apply, by the one or more distributed software agents or the central server, one or more labels to the endpoint device data based on one or more manual or automatically generated labeling rules prior to analyzing the endpoint device data.

18. The method of claim 12, wherein the one or more distributed software agents continuously collect the endpoint data or the network traffic data from the one or more endpoint devices.

19. The method of claim 12, wherein the one or more hardware computer processors are further configured to execute the plurality of computer executable instructions in order to cause the system to access, by the one or more distributed software agents or the central server, one or more databases to collect additional endpoint device data comprising one or more of device media access control (MAC) addresses, operating system versions, device manufacturers, and granular physical device identifications.

20. The method of claim 12, wherein the one or more machine learning sub-models comprise XGBoost or another decision tree ensemble.

21. The method of claim 12, wherein the neural network of each layer comprises a fully connected neural network.

22. The method of claim 12, wherein an output of the neural network comprises a numerical result indicating the probability of an endpoint device having a specific OS family for the first layer, the probability of an endpoint device having a specific OS type for the second layer, and the probability of an endpoint device having a specific device role for the third layer, and wherein if the probability is above a predetermined threshold, the layer classification is generated.

* * * * *